US006954907B2

(12) United States Patent
Nakano et al.

(10) Patent No.: US 6,954,907 B2
(45) Date of Patent: Oct. 11, 2005

(54) SYSTEM OF MANUFACTURING SEMICONDUCTOR INTEGRATED CIRCUIT BY HAVING A CLIENT CONNECTED TO A MANUFACTURER VIA TWO-WAY COMMUNICATION

(75) Inventors: Hirotaka Nakano, Tokyo (JP); Akihiro Asahina, Tokyo (JP); Yoshihiro Ohara, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 425 days.

(21) Appl. No.: 09/855,723

(22) Filed: May 16, 2001

(65) Prior Publication Data

US 2001/0044667 A1 Nov. 22, 2001

(30) Foreign Application Priority Data

May 16, 2000 (JP) ..................................... 2000-142918

(51) Int. Cl.[7] .............................................. G06F 17/50
(52) U.S. Cl. ......................................................... 716/1
(58) Field of Search ..................... 716/1, 2–19; 700/95, 700/97, 121; 707/1, 10; 703/14

(56) References Cited

U.S. PATENT DOCUMENTS

| 5,357,439 | A | | 10/1994 | Matsuzaki et al. ............ 700/96 |
|---|---|---|---|---|
| 5,570,291 | A | * | 10/1996 | Dudle et al. .................. 700/95 |
| 5,768,144 | A | * | 6/1998 | Nagase .......................... 716/4 |
| 5,778,386 | A | * | 7/1998 | Lin et al. ...................... 707/10 |
| 5,878,408 | A | * | 3/1999 | Van Huben et al. ............ 707/1 |
| 6,269,467 | B1 | * | 7/2001 | Chang et al. .................. 716/1 |
| 6,366,874 | B1 | * | 4/2002 | Lee et al. ..................... 703/14 |
| 6,434,440 | B1 | * | 8/2002 | Teranishi et al. ............. 700/97 |
| 6,456,894 | B1 | * | 9/2002 | Nulman ....................... 700/121 |
| 6,487,469 | B1 | * | 11/2002 | Formenti ..................... 700/97 |
| 6,578,188 | B1 | * | 6/2003 | Pang et al. ................... 716/19 |
| 6,594,799 | B1 | * | 7/2003 | Robertson et al. ............. 716/1 |
| 6,634,008 | B1 | * | 10/2003 | Dole .............................. 716/1 |
| 6,788,985 | B2 | * | 9/2004 | Mitsutake et al. ............ 700/97 |
| 2002/0013634 | A1 | * | 1/2002 | Lee .............................. 700/97 |
| 2002/0023329 | A1 | * | 2/2002 | Nulman ..................... 29/25.01 |
| 2002/0078422 | A1 | * | 6/2002 | Bradley et al. ................ 716/1 |
| 2002/0147663 | A1 | * | 10/2002 | Walker et al. ................ 705/26 |
| 2003/0036971 | A1 | * | 2/2003 | Tanabe ........................ 705/26 |
| 2003/0176940 | A1 | * | 9/2003 | Rangachari et al. ......... 700/121 |

FOREIGN PATENT DOCUMENTS

| JP | 5-307579 | 11/1993 |
|---|---|---|
| JP | 6-41805 | 2/1994 |
| JP | 6-180705 | 6/1994 |
| JP | 9-319795 | 12/1997 |
| JP | 10-79435 | 3/1998 |
| JP | 11-15520 | 1/1999 |
| JP | 11-32677 | 2/1999 |
| JP | 11-34598 | 2/1999 |
| JP | 11-50320 | 2/1999 |
| JP | 11-224284 | 8/1999 |
| JP | 2000-76320 | 3/2000 |
| JP | 2000-122011 | 4/2000 |
| KR | 2000-0024317 | 5/2000 |
| WO | 00/68859 | 11/2000 |

OTHER PUBLICATIONS

Aberdeen Group, "Collaborative Product Commerce: Delivering Product Innovations at Internet Speed," Market Viewpoint, V. 12, 1999, retrieved from the internet.

* cited by examiner

Primary Examiner—A. M. Thompson
Assistant Examiner—Magid Y. Dimyan
(74) Attorney, Agent, or Firm—Young & Thompson

(57) ABSTRACT

In a system of manufacturing a semiconductor integrated circuit, a client, a data-managing center, a designing center, and a manufacturing center are connected together via the Internet. The data-managing center has a cost/number-of-days database, a reservation status database, and a design/manufacture status database. Each of the centers uses information contained in the databases of the data-managing center, performs two-way communication with the client, and thereby progresses the production of the semiconductor integrated circuit.

24 Claims, 29 Drawing Sheets

COST/NUMBER-OF-DAYS DATABASE (EXAMPLE)

| URGENCY / PRODUCT TYPE | HIGHEST (H) | | SECOND-HIGHEST (SH) | | REGULAR (R) | | SECOND LOWEST (SL) | | LOWEST (L) | |
|---|---|---|---|---|---|---|---|---|---|---|
| | COST (YEN) | NUMBER OF DAYS REQUIRED | COST (YEN) | NUMBER OF DAYS REQUIRED | COST (YEN) | NUMBER OF DAYS REQUIRED | COST (YEN) | NUMBER OF DAYS REQUIRED | COST (YEN) | NUMBER OF DAYS REQUIRED |
| A | 2,000,000 | 1 | 1,500,000 | 2 | 1,000,000 | 5 | NULL | NULL | 750,000 | 14 OR LESS |
| B | 6,000,000 | 1 | 4,000,000 | 3 | 3,000,000 | 7 | 2,500,000 | 12 | 2,000,000 | 20 OR LESS |
| C | 10,000,000 | 2 | 7,000,000 | 5 | 5,000,000 | 10 | 4,500,000 | 18 | 4,000,000 | 30 OR LESS |
| D | NULL | NULL | 15,000,000 | 10 | 10,000,000 | 14 | 9,000,000 | 25 | NULL | NULL |
| ...... | | | | | | | | | | |

FIG.13

RESERVATION DATABASE (EXAMPLE)

| PRODUCT TYPE | COURSE (URGENCY) | RESERVATION STATUS | | | | | | | |
|---|---|---|---|---|---|---|---|---|---|
| | | 4/1 | 4/2 | 4/3 | 4/4 | 4/5 | 4/6 | 4/7 | 4/8 |
| A | H | 0 | 1 | 0 | 0 | 1 | 0 | 1 | 1 |
| | SH | 1 | 0 | 1 | 2 | 1 | 0 | 2 | 1 |
| | N | 0 | 0 | 2 | 0 | 0 | 1 | 2 | 3 |
| | SL | NULL | | | | | | | |
| | L | 0 | 1 | 1 | 0 | 1 | 2 | 1 | 2 |
| B | H | 0 | 0 | 0 | 0 | 0 | 0 | 0 | 1 |
| | SH | 0 | 0 | 1 | 0 | 0 | 1 | 0 | 0 |
| | N | 0 | 0 | 0 | 1 | 0 | 1 | 1 | 0 |
| | SL | 0 | 0 | 0 | 0 | 0 | 1 | 0 | 0 |
| | L | 1 | 1 | 1 | 0 | 1 | 0 | 1 | 1 |
| C | H | 0 | 0 | 0 | 0 | 0 | 0 | 0 | 2 |
| | SH | 0 | 0 | 0 | 0 | 0 | 0 | 0 | 0 |
| | N | 0 | 0 | 0 | 0 | 0 | 0 | 1 | 1 |
| | SL | NULL | | | | | | | |
| | L | 0 | 0 | 1 | 0 | 0 | 0 | 1 | 0 |
| D | H | 0 | 0 | 0 | 1 | 1 | 1 | 0 | 2 |
| | SH | 0 | 0 | 0 | 0 | 0 | 0 | 0 | 1 |
| | N | NULL | | | | | | | |
| | SL | | | | | | | | |
| | L | | | | | | | | |
| ... | | | | | | | | | |

FIG.14

DESIGN/MANUFACTURE STATUS DATABASE (EXAMPLE)

| | ORDER | | | | RELEASE | | | DESIGN | | | | | MANUFACTURE | | | | |
|---|---|---|---|---|---|---|---|---|---|---|---|---|---|---|---|---|---|
| | | | | | | | | | STEP A1 | | STEP A2 | | | STEP B1 | | STEP B2 | |
| CLIENT | PRODUCT NAME | PRODUCT TYPE | COURSE | RESERVATION DATE | INFORMATION TYPE | SCHEDULED DATE OF RELEASE | COMPLETION DATE OF RELEASE | RESPONSIBLE DESIGNING CENTER | SCHEDULED DATE OF RELEASE | COMPLETION DATE OF RELEASE | SCHEDULED DATE OF RELEASE | COMPLETION DATE OF RELEASE | RESPONSIBLE MANUFACTURING CENTER | SCHEDULED DATE OF RELEASE | COMPLETION DATE OF RELEASE | SCHEDULED DATE OF RELEASE | COMPLETION DATE OF RELEASE |
| AAA1 | ABC | A | N | aa1 | LOGIC DESIGN DATA | ab1 | ac1 | X1 | ad1 | ae1 | af1 | ag1 | Y1 | ah1 | ai1 | aj1 | |
| AAA2 | EFG | D | N | aa2 | LOGIC DESIGN DOC. | ab2 | ac2 | X2 | ad2 | ae2 | af2 | | | | | | |
| AAA3 | EFH | C | L | aa3 | CIRCUIT DESIGN DATA | ab3 | ac3 | X2 | ad3 | ae3 | af3 | ag3 | Y1 | ah3 | | aj3 | |
| AAA4 | KLM | B | SH | aa4 | LOGIC DESIGN DATA | ab4 | | X1 | ad4 | | af4 | | Y2 | ah4 | | aj4 | |
| ... | ... | ... | ... | ... | ... | ... | ... | ... | ... | ... | ... | ... | ... | ... | ... | ... | ... |

FIG.15

CENTER-OPERATION-STATUS DATABASE (EXAMPLE)

| NAME OF CENTER | JAN. | | | FEB. | | | MAR. | | | APR. | | | MAY. | | | ... |
|---|---|---|---|---|---|---|---|---|---|---|---|---|---|---|---|---|
| | NUMBER OF OPERATING RESOURCES | NUMBER OF OPERATING RESOURCES (NUMBER OF RESERVATIONS) | OPERATION RATIO | NUMBER OF OPERATING RESOURCES | NUMBER OF OPERATING RESOURCES (NUMBER OF RESERVATIONS) | OPERATION RATIO | NUMBER OF OPERATING RESOURCES | NUMBER OF OPERATING RESOURCES (NUMBER OF RESERVATIONS) | OPERATION RATIO | NUMBER OF OPERATING RESOURCES | NUMBER OF OPERATING RESOURCES (NUMBER OF RESERVATIONS) | OPERATION RATIO | NUMBER OF OPERATING RESOURCES | NUMBER OF OPERATING RESOURCES (NUMBER OF RESERVATIONS) | OPERATION RATIO (RESERVATION RATIO) | ... |
| DESIGNING CENTER X1 | 28 | 30 | 93.3% | 30 | 30 | 100.0% | 35 | 40 | 87.5% | 36 | 40 | 90.0% | 16 | 40 | 40.0% | ... |
| DESIGNING CENTER X2 | 26 | 30 | 86.7% | 27 | 30 | 90.0% | 27 | 30 | 90.0% | 26 | 30 | 86.7% | 11 | 30 | 36.7% | ... |
| ... | ... | ... | ... | ... | ... | ... | ... | ... | ... | ... | ... | ... | ... | ... | ... | ... |
| MANUFACTURING CENTER Y1 | 30 | 30 | 100.0% | 29 | 30 | 96.7% | 30 | 30 | 100.0% | 26 | 30 | 86.7% | 14 | 30 | 46.7% | ... |
| MANUFACTURING CENTER Y2 | 19 | 20 | 95.0% | 20 | 20 | 100.0% | 20 | 20 | 100.0% | 15 | 20 | 75.0% | 6 | 20 | 30.0% | ... |
| MANUFACTURING CENTER Y3 | | | | | | | | | | 15 | 20 | 75.0% | 7 | 20 | 35.0% | ... |
| ... | | | | | | | ... | | | ... | | | ... | | | ... |

FIG.16

CANCELATION DATABASE (EXAMPLE)

| PRODUCT TYPE \ URGENCY | HIGHEST (H) | | SECOND HIGHEST (SH) | | REGULAR (R) | | SECOND LOWEST (SL) | | LOWEST (L) | |
|---|---|---|---|---|---|---|---|---|---|---|
| | WITHIN 2 DAYS | WITHIN TODAY | WITHIN 5 DAYS | WITHIN TODAY | WITHIN 7 DAYS | WITHIN TODAY | WITHIN 7 DAYS | WITHIN TODAY | WITHIN 10 DAYS | WITHIN TODAY |
| A | 600,000 | 1,000,000 | 300,000 | 600,000 | 100,000 | 300,000 | NULL | NULL | 80,000 | 250,000 |
| B | 1,800,000 | 3,000,000 | 800,000 | 1,600,000 | 300,000 | 900,000 | 250,000 | 750,000 | 200,000 | 600,000 |
| C | 3,000,000 | 5,000,000 | 1,400,000 | 2,800,000 | 500,000 | 1,500,000 | 450,000 | 1,350,000 | 400,000 | 1,200,000 |
| D | NULL | NULL | 3,000,000 | 5,000,000 | 1,000,000 | 3,000,000 | 900,000 | 2,700,000 | NULL | NULL |
| ...... | | | | | | | | | | |

(COST UNIT : YEN)

FIG.17

INSURANCE DATABASE (EXAMPLE)

| URGENCY / PRODUCT TYPE | HIGHEST (H) | | SECOND HIGHEST (SH) | | REGULAR (R) | | SECOND LOWEST (SL) | | LOWEST (L) | |
|---|---|---|---|---|---|---|---|---|---|---|
| | REDESIGN-INSURANCE PREMIUM | CANCELLATION-INSURANCE PREMIUM | REDESIGN-INSURANCE PREMIUM | CANCELLATION-INSURANCE PREMIUM | REDESIGN-INSURANCE PREMIUM | CANCELLATION-INSURANCE PREMIUM | REDESIGN-INSURANCE PREMIUM | CANCELLATION-INSURANCE PREMIUM | REDESIGN-INSURANCE PREMIUM | CANCELLATION-INSURANCE PREMIUM |
| A | r1a | c1a | r2a | c2a | r3a | c3a | NULL | NULL | r5a | c5a |
| B | NULL | NULL | r2b | c2b | r3b | c3b | r4b | c4b | r5b | NULL |
| C | r1c | c1c | r2c | c3c | r3c | c3c | r4c | c4c | r5c | c5c |
| D | NULL | NULL | r2d | c3d | r3d | c3d | r4d | c4d | NULL | NULL |
| ..... | ..... | ..... | ..... | ..... | ..... | ..... | ..... | ..... | ..... | ..... |

FIG.18

PER-CLIENT DESIGN-AND-MANUFACTURE HISTORICAL-LOG DATABASE (EXAMPLE)

| | | | | CURRENT PRODUCT | | | | | TOTAL | | | | | | |
|---|---|---|---|---|---|---|---|---|---|---|---|---|---|---|---|
| | | | | | ORDER | | MANUFACTURE | | | ORDER | | | MANUFACTURE | | |
| CLIENT | PRODUCT NAME | PRODUCT TYPE | COURSE | RESERVATION DATE | NUMBER OF REDESIGN OCCURRENCES | CANCELLATION | NUMBER OF MANUFACTURES | CANCELLATION | PRODUCT TYPE | NUMBER OF REDESIGN ORDERS | REDESIGN OCCURRENCE RATIO | CANCELLATION RATIO | RESERVATION RESTRICTION | NUMBER OF REDESIGN ORDERS | REDESIGN OCCURRENCE RATIO | CANCELLATION RATIO | RESERVATION RESTRICTION |
| AAA1 | ABA | A | SH | ba1 | bb1 | * | bc1 | | A | bd1 | be1 | bf1 | | bg1 | bh1 | bi1 | |
| | ABB | C | SL | ba2 | bb2 | | bc2 | * | B | bd2 | be2 | bf2 | | bg2 | bh2 | bi2 | |
| | ABC | A | N | ba3 | bb3 | | bc3 | | C | bd3 | be3 | bf3 | | bg3 | bh3 | bi3 | * |
| | ... | ... | ... | ... | ... | ... | ... | ... | ... | ... | ... | ... | ... | ... | ... | ... | ... |
| | EFG | D | N | ca1 | cb1 | | | | A | cd1 | ce1 | cf1 | * | cg1 | ch1 | ci1 | |
| AAA2 | EFH | C | SL | ca2 | cb2 | | cc2 | | B | cd2 | ce2 | cf2 | | cg2 | ch2 | ci2 | |
| | ... | ... | ... | ... | ... | ... | ... | ... | ... | ... | ... | ... | ... | ... | ... | ... | ... |
| ... | | | | | | | | | | | | | | | | | |

FIG.19

REVISION-MANAGEMENT DATABASE (EXAMPLE)

| | | CURRENT PRODUCT | DESIGN DATA PARAMETER | | | | | | |
|---|---|---|---|---|---|---|---|---|---|
| CLIENT | PRODUCT NAME | PRODUCT TYPE | NUMBER OF REVISIONS | NUMBER OF GATES | DELAY TIME | AREA SIZE | CONSUMPTION POWER | NET | FF | |
| AAA1 | AAG | A | rev1 | pa1 | pb1 | pc1 | pd1 | pe1 | pf1 | ⋮ |
| | | | rev2 | pa2 | pb2 | pc2 | pd2 | pe2 | pf2 | ⋮ |
| | AAH | B | rev1 | pa2 | pb3 | pc3 | pd3 | pe3 | pf3 | ⋮ |
| | | | rev2 | pa4 | pb4 | pc4 | pd4 | pe4 | pf4 | ⋮ |
| | | | rev3 | pa5 | pb5 | pc5 | pd5 | pe5 | pf5 | ⋮ |
| ⋮ | ⋮ | ⋮ | ⋮ | ⋮ | ⋮ | ⋮ | ⋮ | ⋮ | ⋮ | ⋮ |

FIG.20

SYSTEM OF MANUFACTURING SEMICONDUCTOR INTEGRATED CIRCUIT BY HAVING A CLIENT CONNECTED TO A MANUFACTURER VIA TWO-WAY COMMUNICATION

BACKGROUND OF THE INVENTION

The present invention relates to a system of manufacturing a semiconductor integrated circuit. Particularly, the invention relates to a fabrication system for an application-specific integrated circuit (ASIC).

Generally, the production of semiconductor integrated circuits is divided and progressed in a design division and a fabrication division, these divisions exchanging information with each other. In the production, design-related information created in the design division needs to be consistent in contents with fabrication-related information created in the design division. Techniques for preventing inconsistency between two types of the information are disclosed in, for example, Japanese Unexamined Patent Publication (JP-A) No. H 10-79435, which is incorporated herein by reference.

A recent tendency is mainly directed to standardized integrated circuits (ICs) prevail, but ASICs are also supported by particular demands. For example, the demands relate to the realization of system large-scale integrated circuits (LSIs) according to needs of users who attempts discrimination of products from those developed by their competitors and practical use of large-diameter wafers. Since ASICs directly affects clients' products, they should be developed, designed, and fabricated in a close relationship between a client and a semiconductor manufacturer with an organizational system that allow cooperative joint-work organization. This system requires agreements to be made between the client and the semiconductor manufacturer for various matters, for example, work interfaces, design specifications, developing tools, product quality, test data, production periods, and costs.

Recently, attempts have been made to use the Internet, which has been widespread rapidly in these years, for the production of ASICs. For example, according to a system proposed by Quicklogic Corp., a client releases layout data from an FPGA developing tool (FPGA: field programmable gate array) via the Internet. A manufacturing center writes the received data into FPGA chips, and sends completed circuit chips to the client via a normal transporting means. For another example, according to a system proposed by Clear Logic Inc., a client creates layout data for FPGAs of a different company (Altera Corp.), and sends the data via the Internet. A manufacturing center uses the received data, thereby manufactures products of its own, and sends completed products (circuit chips) to the client by means of a normal transporting means.

SUMMARY OF THE INVENTION

An object of the present invention is to provide an improved system of manufacturing a semiconductor integrated circuit which allows a client to perform suitable and flexible ordering that meets product market conditions.

Another object of the invention is to provide an improved system of manufacturing a semiconductor integrated circuit, where a client can obtain benefits of reduction in a product development period, reduction in the cost, and improvement in quality of the product.

Still another object of the invention is to provide an improved system of manufacturing a semiconductor integrated circuit, where a semiconductor manufacturer can make stable production plans.

Yet another object of the invention is to provide an improved system of manufacturing a semiconductor integrated circuit, which can be flexibly built by a semiconductor manufacturer to meet market conditions.

According to one aspect of the present invention, in a system of manufacturing a semiconductor integrated circuit, a data-managing center (3), a designing center (4), and a manufacturing center (5), which are operation centers on the side of a semiconductor manufacturer, and a client (1) are connected together via the Internet (2). Each of the operation centers (3, 4, and 5) uses information contained in databases (31, 32, and 33) provided in the data-managing center (3), performs two-way communication with the client (1), and thereby progresses the production of semiconductor integrated circuit.

In more specific, the system of manufacturing a semiconductor integrated circuit may be configured such that operation centers (3, 4, and 5), which are a data-managing center (3), a designing center (4), and a manufacturing center (5), are connected together via the Internet (2). In this, the data-managing center (3) comprises databases including a cost/number-of-days database (31) containing data representing courses for manufacturing the semiconductor integrated circuit, each of which has attributes of costs and the number of days in units of a product type and an urgency degree of the semiconductor integrated circuit; a reservation status database (32) containing data of an acceptable reservation quantity in units of the product type and the urgency degree of the semiconductor integrated circuit and in units of chip-completion date; and a design/manufacture status database (33) containing data representing statuses of ordering, releasing, designing, and manufacturing in units of a client. The data-managing center (3) communicates with the client (2) to thereby perform data management. The designing center (4) communicates with the client (1), performs designing of the semiconductor integrated circuit according to release data from the client, and outputs layout data as a product of the designing. The manufacturing center (5) performs manufacturing of the semiconductor integrated circuit according to manufacture data that is released from one of the designing center and the client and tat is intended for use in the manufacturing. Each of the operation centers (3, 4, and 5) uses information contained in the databases (31, 32, and 33) provided in the data-managing center (3), performs two-way communication with the client (1), and thereby progresses the production of the semiconductor integrated circuit.

Furthermore, the system of manufacturing a semiconductor integrated circuit may be configured such that operation centers (41, 42, 51, and 52), which are a data-managing center (3), a plurality of designing centers (41 and 42), and a plurality of manufacturing centers (51 and 52), are connected together via the Internet. In this, the data-managing center (3) comprises databases (31, 32, and 33) including a cost/number-of-days database (31) containing data representing courses for manufacturing the semiconductor integrated circuit, each of which has attributes of costs and the number of days in units of a product type and an urgency degree of the semiconductor integrated circuit; a reservation status database (32) containing data of an acceptable reservation quantity in units of the product type and the urgency degree of the semiconductor integrated circuit and in units of chip-completion date; a design/manufacture status database (33) containing data representing statuses of ordering, releasing, designing, and manufacturing in units of a client.

The data-managing center (3) communicates with the client (1) to thereby perform data management. Each of the designing centers (41 and 42) closely communicates with the client (1), performs designing of the semiconductor integrated circuit according to release data provided from the client (1), and outputs layout data as a product of the designing. Each of the manufacturing centers (51 and 52) performs manufacturing of the semiconductor integrated circuit according to manufacture data that is released from one of the designing center (41 or 42) and the client (1) and that is intended for use in the manufacturing. The data-managing center (1), and each of the designing centers (41 and 42) and the manufacturing centers (51 and 52) uses information contained in the databases (31, 32, and 33) provided in the data-managing center (3), performs two-way communication with the client (1), and thereby progresses the production of the semiconductor integrated circuit.

In the above, the data-managing center (3) may comprise a design data file (40) for retaining release data released from the client (1), a manufacture data file (50) for retaining the manufacture data released from one of the designing center (41 or 42) and the client (1), and a center-operation-status database (60) containing operation statuses of the operation centers (41, 42, 51, and 52).

As summarized above, the data-managing center (3) is connected to the various databases (31, 32, 33, and 60) to thereby allow bilateral-communication characteristics of the Internet (2) to be used between the client (1) and each of the semiconductor-manufacturer-side operation centers (3, 4, and 5; or 41, 42, 51, and 52). Therefore, the databases (31, 32, 33, and 60) can be efficiently used.

BRIEF DESCRIPTION OF THE DRAWINGS

FIG. 13 shows a practical example of storage contents of a cost/number-of-days database according to the present invention;

FIG. 14 shows a practical example of storage contents of a reservation status database according to the present invention;

FIG. 15 shows a practical example of storage contents of a design-and-manufacture database according to the present invention;

FIG. 16 shows a practical example of storage contents of a center-operation-status database according to the present invention;

FIG. 17 shows a practical example of storage contents of a cancellation database according to the present invention;

FIG. 18 shows a practical example of storage contents of an insurance database according to the present invention;

FIG. 19 shows a practical example of storage contents of a per-client design/manufacture historical-log database according to the present invention;

FIG. 20 shows a practical example of storage contents of a revision-management database according to the present invention;

DESCRIPTION OF THE PREFERRED EMBODIMENTS

Hereinbelow, the preferred embodiments of the present invention will be described wit reference to the accompanying drawings.

Overall Configuration

Figure 1:
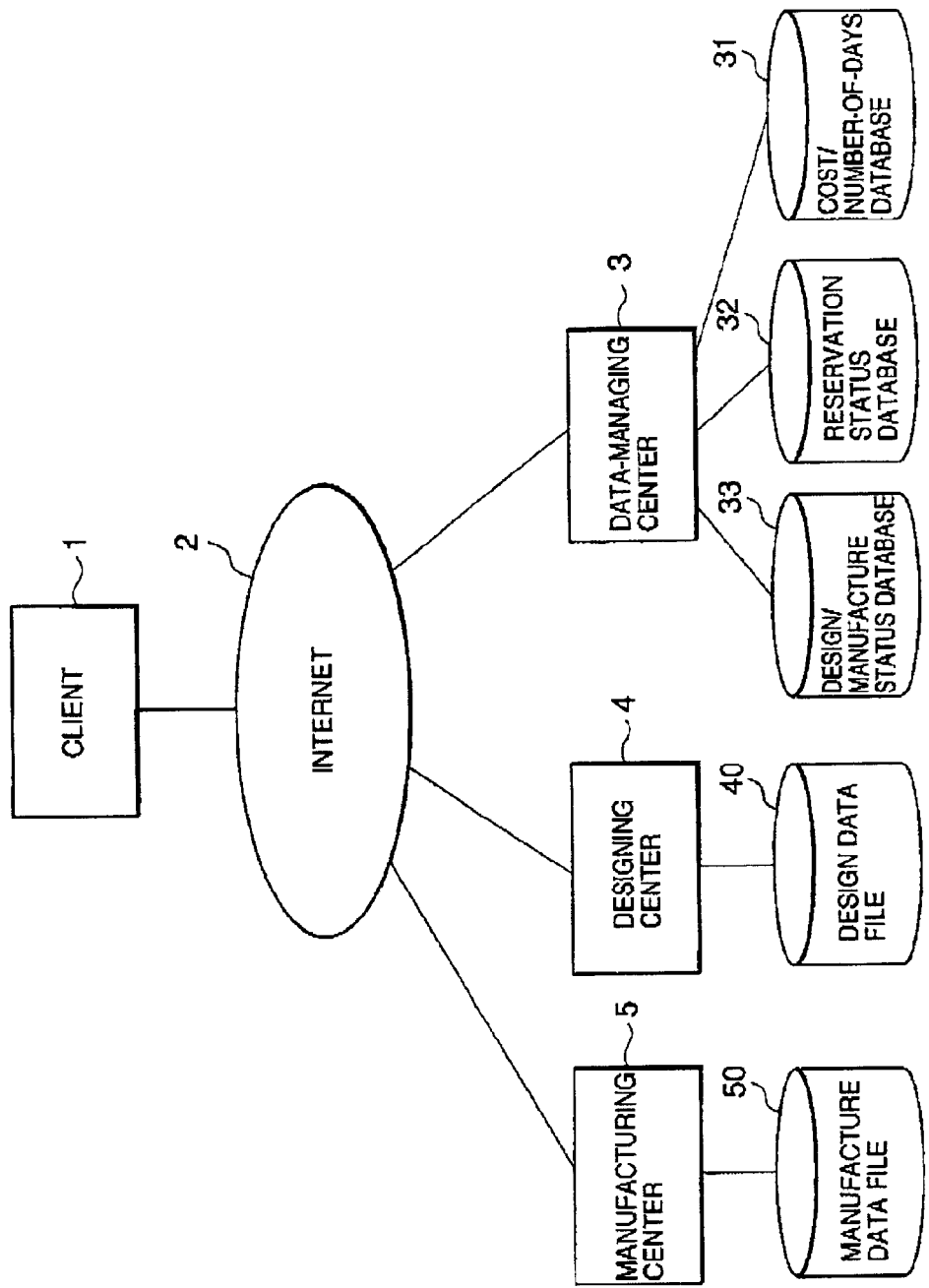
FIG. 1 is a schematic configuration view of a first embodiment according to the present invention.

FIG. 1 is a configuration view of an ASIC-manufacturing system according to a first embodiment of the present invention. In the system, a client 1 (user) and a semiconductor manufacturer (ASIC manufacturer) is connected together via the Internet 2. Data is exchanged between the client 1 and semiconductor manufacturer to progress manufacturing of ASICs. The semiconductor manufacturer includes three operation centers: a designing center 4 (designing division); a manufacturing center 5 (manufacturing division); and a data-managing center 3 that manages the exchanged data, the number of days, and costs.

The designing center 4 has a design data file 40 containing release data released from the client 1. The manufacturing center 5 has a manufacture data file 50 that stores manufacture data received from the designing center 4 and/or the client 1. The data-managing center 3 has a cost/number-of-days database 31, a reservation status database 32, and a design/manufacture status database 33. Although each of the operation centers 3 to 5 is practically constituted of people, an information processing system, and operators of the system, it is shown as a server in FIG. 1.

Figure 2:
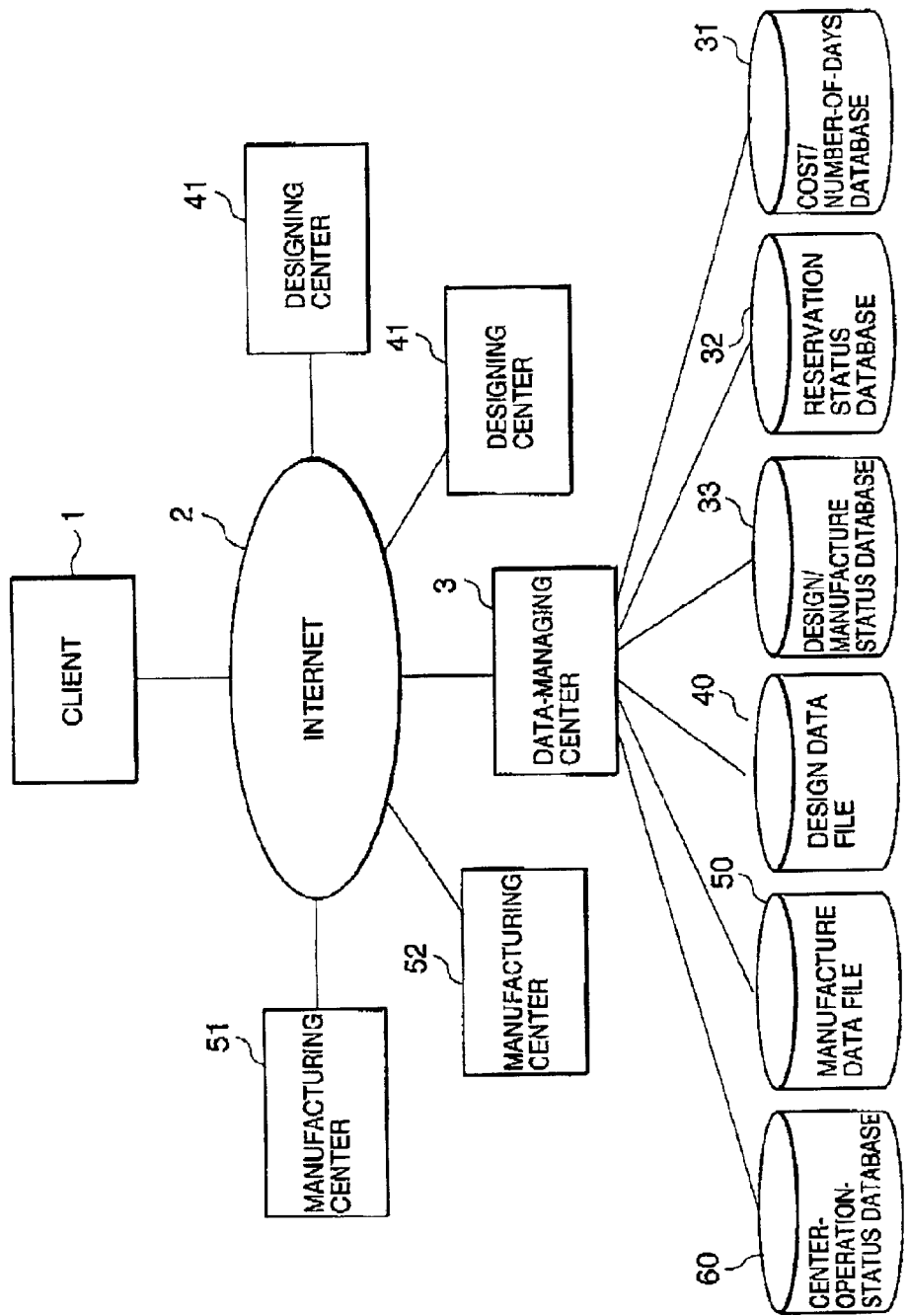
FIG. 2 is a schematic configuration view of a second embodiment according to the present invention.

FIG. 2 shows a second embodiment of the present invention. The second embodiment corresponds to a case where two designing centers 41 and 42 and two manufacturing centers 51 and 52 are provided. In this case, either a plurality of only designing centers or a plurality of manufacturing centers may be provided. The designing centers 41 and 42 may be provided in, for example, the USA; and the manufacturing centers 51 and 52 may be provided in, for example, Taiwan. Even in overseas countries, real-time communication can be performed through the Internet 2.

In the second embodiment, a data-managing center 3 one-dimensionally controls a design data file 40 that is provided in each of the designing centers 41 and 42, and a manufacture data file 50 that is provided in each of the manufacturing centers 51 and 52. This control facilitates data communication with a client 1. Upon receipt of an order from the client 1 for manufacturing of ASICs, the data-managing center 3 checks the operation status of each of the designing centers 41 and 42 and the manufacturing centers 51 and 52, and thereby selects appropriate one of the designing centers 41 and 42 and one of the manufacturing centers 51 and 52. Information required for the selection is stored in a center-operation-status database 60. The number of the designing centers and the manufacturing centers may be increased depending on the reservation status and the design/manufacture status.

Figure 3:
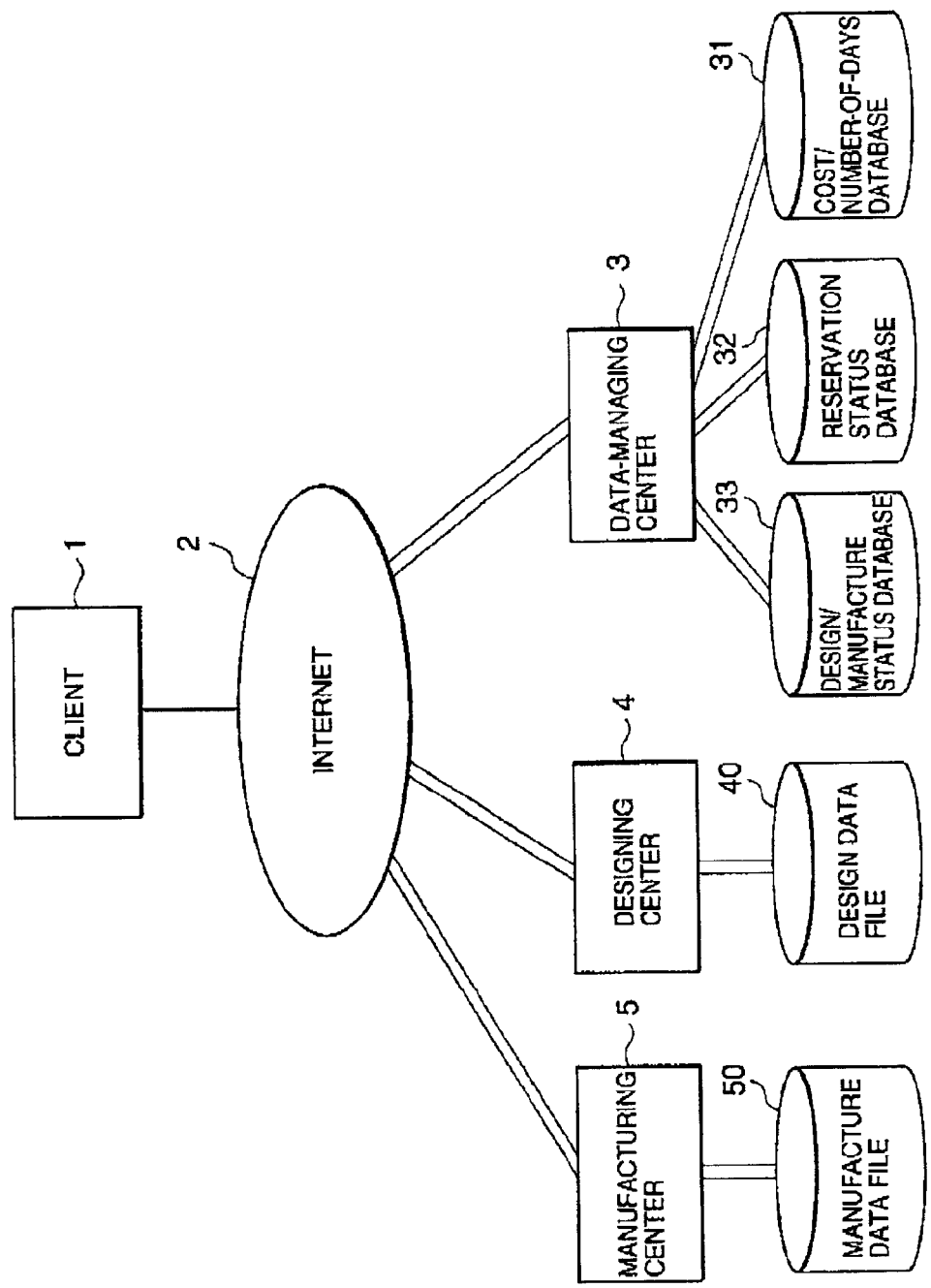
FIG. 3 is a schematic view of a configuration according to a third embodiment of the present invention, in which a network is mirrored.

FIG. 3 shows a third embodiment of the present invention. This embodiment relates to a fail-safe configuration. In this embodiment, the connections of a data-managing center 3, a designing center 4, and manufacturing center 5 to the Internet 2 are mirrored, respectively. In addition, network-mirroring is implemented between the data-managing center 3 and each of databases 31, 32, and 33, between a designing center 4 and a design data file 40, and between a manufacturing center 5 and a manufacture data file 50. Thereby, even when a failure occurs in one of each of the pairs of networks during processing, the other one of each of the pairs of networks instead functions to continue the processing without problems.

Figure 4:
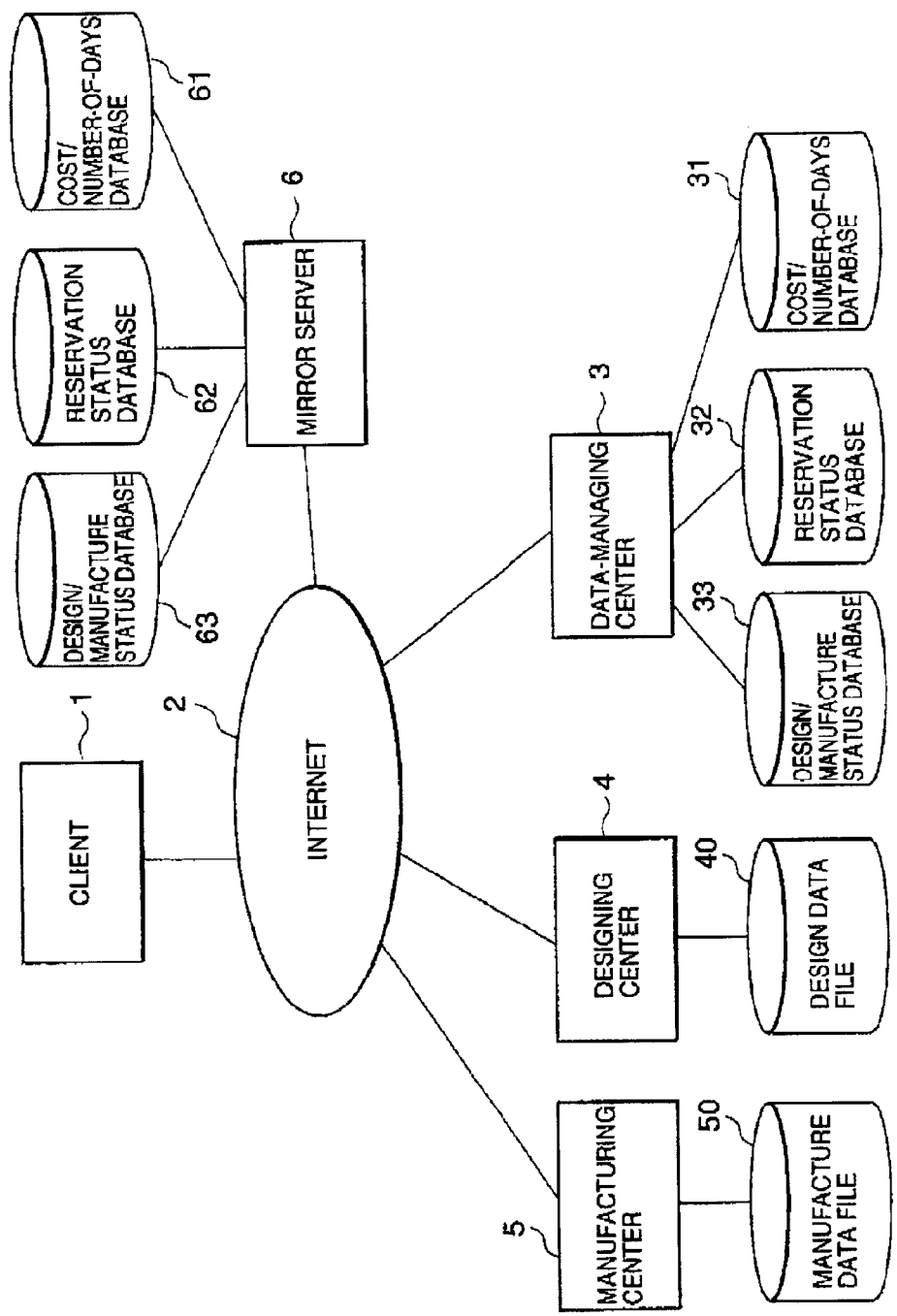
FIG. 4 is a schematic view of a configuration according to a fourth embodiment of the present invention, which includes a mirror server.

FIG. 4 shows a fourth embodiment. As shown in the figure, the fourth embodiment has a mirror server 6 relative to a data-managing center 3. In this embodiment, similarly to the data-managing center 3, the mirror server 6 is connected to a cost/number-of-days database 61, a reservation status database 62, and a design/manufacture status database 63 Thus, similarly to the third embodiment, the fourth embodiment has a fail-safe configuration. As the name implies, the mirror server 6 performs the same operation as the data-managing center 3. Thereby, even when a failure occurs in the data-managing center 3 during processing, the processing can be continued without problems.

To avoid the drawings to be complicated, each of FIGS. 3 and 4 shows the example configuration relative to the first embodiment including a manufacturing center and a designing center As a matter of course, however, fail-safe mechanisms similar to those described above may be provided in the second embodiment that includes the plurality of designing centers and manufacturing centers.

Security of Private Information

Figure 5:
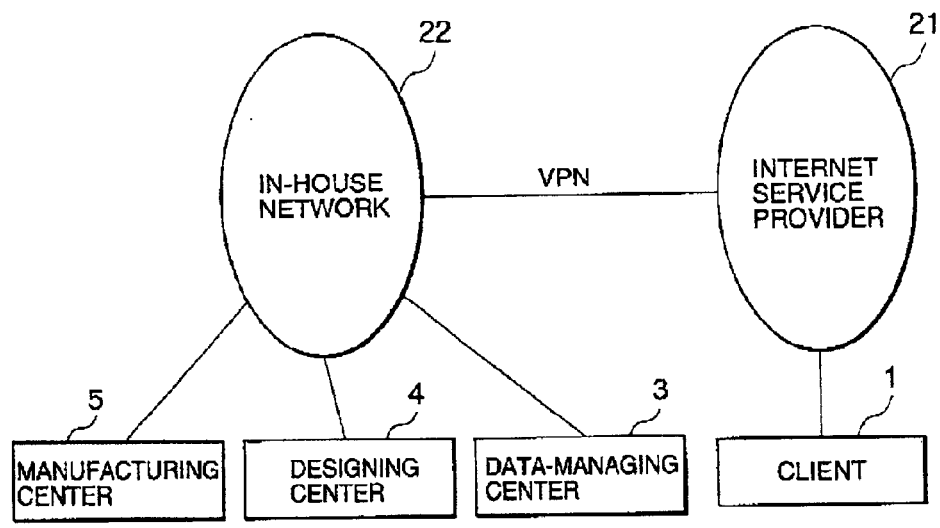
FIG. 5 shows a practical example of the first embodiment shown in FIG. 1.
Figure 6:
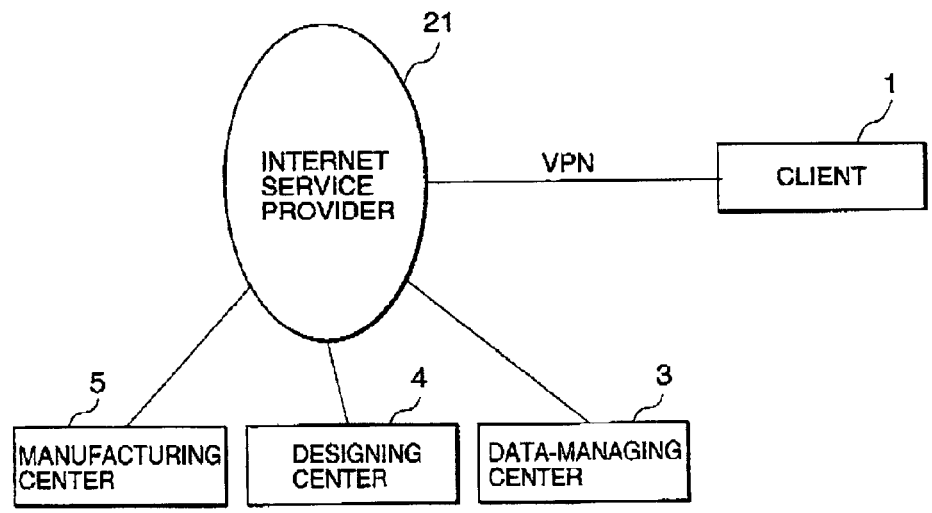
FIG. 6 shows a practical example of the second embodiment shown in FIG. 1.
Figure 7:
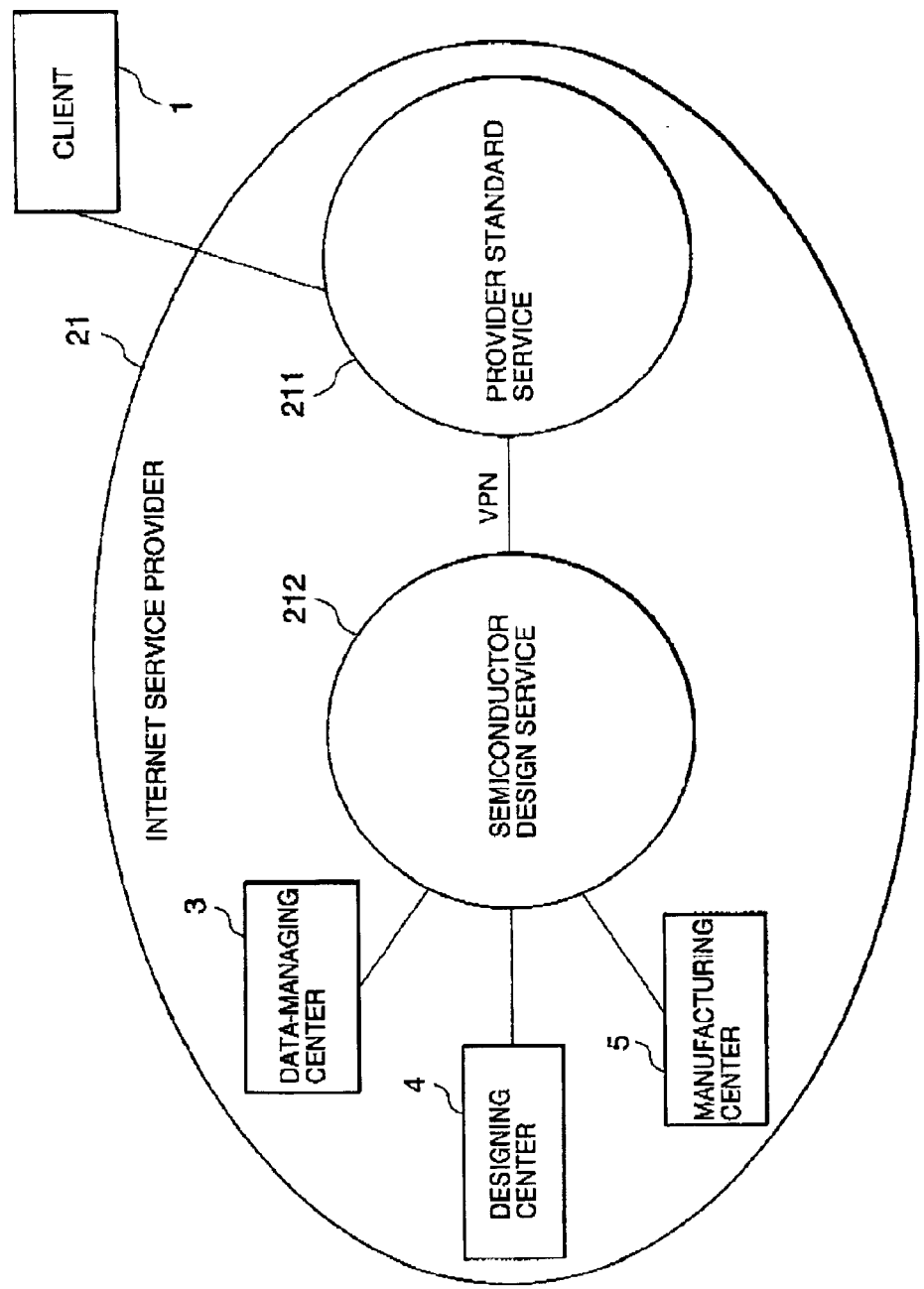
FIG. 7 shows a practical example of the third embodiment shown in FIG. 1.

FIGS. 1 to 4 show conceptual configurations. In practice, however, as shown in FIGS. 5 to 7, a virtual private network (VPN) is used to protect private information of a client 1 from leakage when a client receives ASIC-manufacture-related services provided by a semiconductor manufacturer. The "virtual private network (VPN)" is a generic name of services that allow a public network to be used as a dedicated network, and it is therefore called a "virtual closed-area network".

In FIG. 5, an internet service provider 21 (ISP) and an in-house network 22 are involved between a client 1 and individual centers 3 to 5; and a VPN connects the internet service provider 21 and the in-house network 22. The individual centers 3 to 5 are connected via the in-house network 22. In FIG. 6, a client 1 and an internet service provider 21 are connected together via a VPN. Individual operation centers 3 to 5 are connected to an internet service provider 21. The configuration shown in FIG. 5 is advantageous in the security of private information, while the configuration shown in FIG. 6 is advantageous in the usability of the client 1. In a configuration shown in FIG. 7, a VPN connects a provider standard service 211 and a semiconductor design service 212 in an internet service provider 21. The operation centers 3 to 5 are individually connected to the provider standard service 211 via the semiconductor design service 212.

Figure 8:
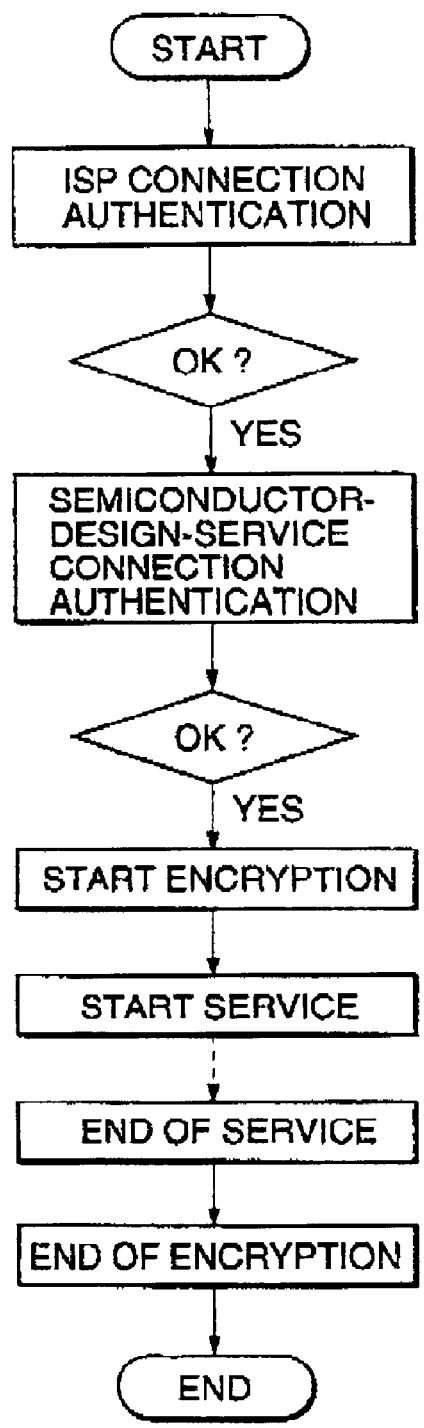
FIG. 8 shows a flowchart of authenticating processing.

FIG. 8 shows operations that are performed by a client 1 to establish a connection with a Web server in order to receive an ASIC-manufacturing service. First, the client 1 attempts to obtain an ISP connection authentication (ISP: Internet service provider). Upon receipt of the authentication, the client 1 then attempts to obtain a semiconductor-design-service connection authentication. Upon receipt of the authentication, the client 1 is qualified to receive a service that allows the client to encrypt data, such as release data, and to receive and transmit the encrypted data. The semiconductor-design-service connection authentication is performed using information, such as identification (ID) information allocated to the client 1, machine-specific information (such as MAC information of a network card) of the client 1, and developing-tool license information provided to the client 1. To access one of the databases 31 to 33 by using ID information, the client 1 issues preallocated ID information. The database to be accessed accesses the client 1, obtains the ID information, and then performs authentication. According to the client authentication, per-client access status information can be collected. The collected information is analyzed to perform risk management for redesign (rework) ratios and the like in units of the client. Thereby, service fees and information disclosure limitations can be set depending on the rework ratios.

Outline of Processing

The client 1 can use three order modes to order ASICs from a semiconductor manufacturer. They are a mode for designing and manufacturing, a mode only for designing, and a mode only for manufacturing. The mode for the designing may be classified to be more specific depending on types of release data that includes logic-design specifications, logic-design data, circuit design data, layout design data, and mask design data.

Figure 9:
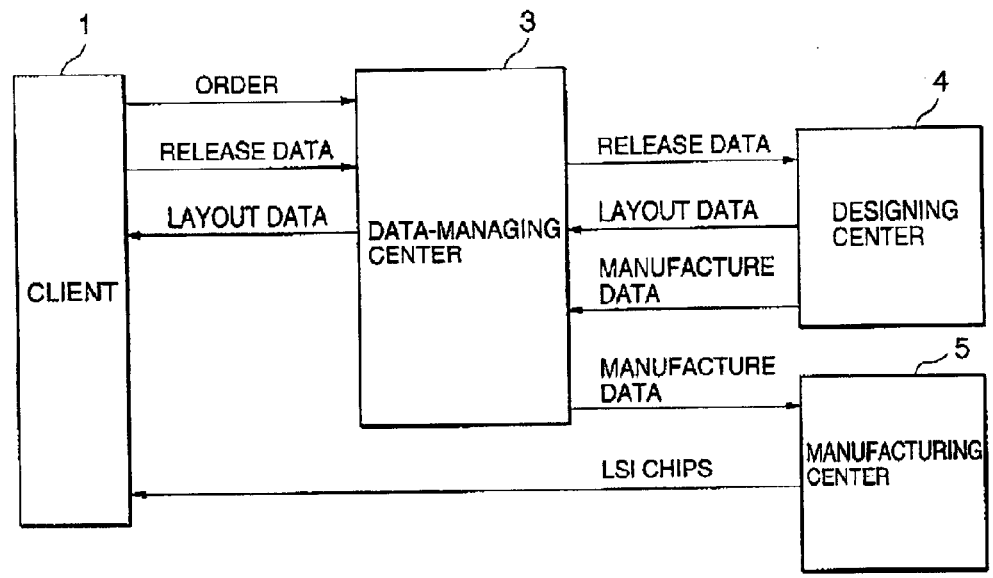
FIG. 9 shows a first order mode of the present invention, in which a client orders designing and manufacturing.

FIG. 9 shows the relationship among the client 1, the data-managing center 3, the designing center 4, and the manufacturing center 5 when the order mode for designing and manufacturing is executed. To place an order with a semiconductor manufacturer for manufacturing of ASICs, the client 1 first accesses a data-managing center 3 via an Internet 2 and makes inquiry to obtain information about whether manufacturing lines in the semiconductor manufacturer are available to handle the new order or are not available to handle the new order because of overlapped orders, and what order modes are set. In response, the data-managing center 3 accesses a reservation status database 32 and a cost/number-of-days database 31, obtains necessary information, and sends a response based on the information to the client 1 via the Internet 2.

Upon receipt of the response, the client 1 checks the manufacturing-line status, costs, the number of days, and the like. Then, the client 1 selects from specified reservation courses an appropriate course close to a desired course, and issues a reservation application for the selected course via the Internet 2. In response to the reservation application, the data-managing center 3 issues a reservation-reception notification to the client 1 via the Internet 2. This completes the reservation processing.

Subsequently, as shown in FIG. 9, the client 1 issues an order to the data-managing center 3 via the Internet 2, and sends release data to the data-managing center 3. The data-managing center 3 sends the release data to the designing center 4 via the Internet 2. Upon receipt, the designing center 4 stores the release data in a design data file 40. Thereby, designing of the ASICs is started.

The contents of designing to be carried out by the designing center 4 are different depending on the contents of a contract concluded between the client 1 and the semiconductor manufacturer. For example, a client orders overall designing, while a different client orders for designing of circuits and subsequent portions. The designing center 4 periodically reports the design status to the data-managing center 3. The reporting may be made to cover either the overall design or per-stage design. After completion of the design, the designing center 4 sends layout data to the data-managing center 3 via the Internet 2. The data-managing center 3 sends the layout data to the client 1 via the Internet 2. In is Specification, "layout data" is not limited to back annotation data, and it refers to data that is produced on the basis of release data received on a designing center 4 from a client 1 and that is sent as a design result to the client 1.

The client 1 checks the layout data by conducting, for example, a physical delay analysis, and reports the result to the designing center 4 via the Internet 2. When the check result is acceptable, the designing center 4 sends manufacture data to the data-managing center 3, and the data-managing center 3 releases the manufacture data to the manufacturing center 5. In this Specification, "manufacture data" is not limited to mask data, and it refers to data used in the manufacture in the manufacturing center 5.

The manufacturing center 5 stores the manufacture data in a manufacture data file 50, and then starts the manufacturing of the ASICs. The manufacturing center 5 periodically reports the manufacturing status to the data-managing center 3. Upon completion of the manufacture of the ASICs, the manufacturing center 5 transports the completed LSI chips to the client 1 by means of normal transporting means.

In the above-described example, progress-status information on design, manufacture, and the like are periodically collected in the data-managing center 3. Therefore, the client 1 can obtain desired status information by accessing the data-managing center 3 through the Internet 2. Therefore, according to the present embodiment, the client 1 and the semiconductor manufacturer can monitor the progress of the ASICs production by exchanging information.

Direct Access from Client to Designing Center

In the above-described embodiment, all the client 1 have to do until the completion of designing is to wait for the layout data to be sent from the designing center 4. However, depending on the case, the client 1 wants to check the status of the layout data, that is, an interim report from design tools, prior to the completion of design, and modifies design on the side of the client 1. Specifically, when the client 1 detects a defect in its design, it reviews reserved schedules, costs, and the like; and when it finds the defect to be its own responsibility, it reorders for the ASICs. To allow the aforementioned checking to be performed, an embodiment can be conceived in which the client 1 can directly access the designing center 4 via the Internet 2. According to the embodiment configured in this way, the client 1 can directly send release data to the designing center 4 without the data-managing center 3 being involved, while the designing center 4 can directly send layout data to the client 1 but not through the data-managing center 3.

Processing in Second Embodiment

The above description assumes the use of the first embodiment. Basically, the description can be applied to the second embodiment. In the second embodiment, since the plurality of designing centers and the plurality of manufacturing centers are provided, the data-managing center 3 selects desired centers, and sends release data and manufacture data to selected centers. Specifically, after completion of designing, the selected designing center sends manufacture data to the data-managing center 3, and the data-managing center 3 sends the manufacture data to the selected manufacturing center. In order to carry out the above-mentioned selection of the centers, the data-managing center 3 makes referential access to the center-operation-status database 60. Alternatively, a manufacturing center to which the manufacture data is sent from the data-managing center 3 may be predetermined. In this case, the designing center 4 can directly send design data to the predetermined manufacturing center without the data-managing center 3 being involved.

Other Order Modes

Figure 10:
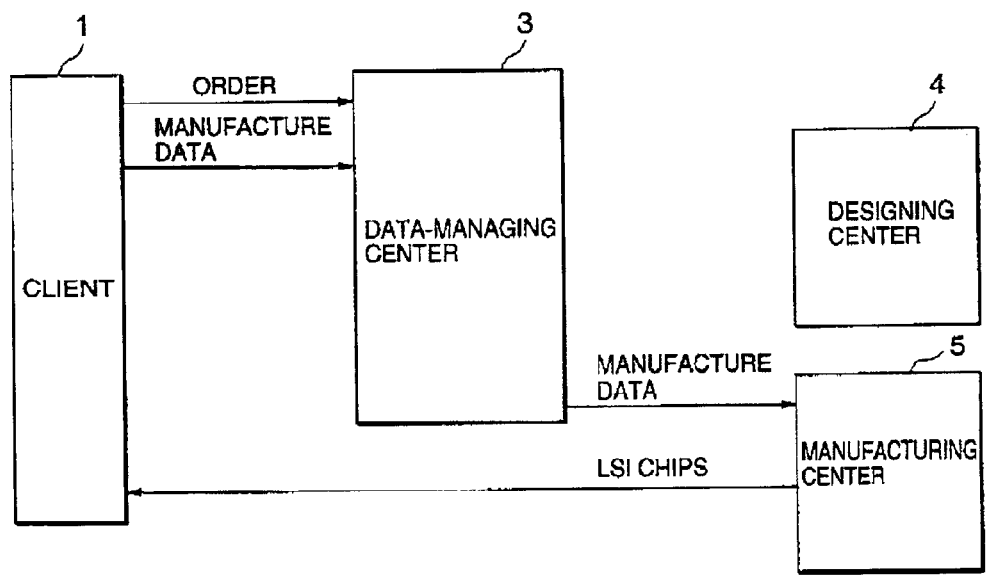
FIG. 10 shows a second order mode of the present invention, in which a client orders only manufacturing.

As described above, the client 1 can use three order modes to place orders with a semiconductor manufacturer for ASICs. That is, the client 1 can use the mode for designing and manufacturing, the mode only for designing, and the mode only for manufacturing. The example cases where designing and manufacture ordered are illustrated in FIG. 9. FIG. 10 shows an example case only manufacture is ordered. In the illustrated example, the client 1 sends manufacture data to the data-managing center 3. The data-managing center 3 sends the manufacture data, which has been received from the client 1, to the manufacturing center 5. According to the received manufacture data, the manufacturing center 5 manufactures LSI chips, and transports completed LSI chips to the client 1. It is noted here that, if a designing center has a past manufacture experience for an order issued from the same client 1, the semiconductor manufacturer retains relative manufacture data. Therefore, when the retained manufacture data is used for a new order, the client 1 need not send the manufacture data to the semiconductor manufacturer.

Figure 11:
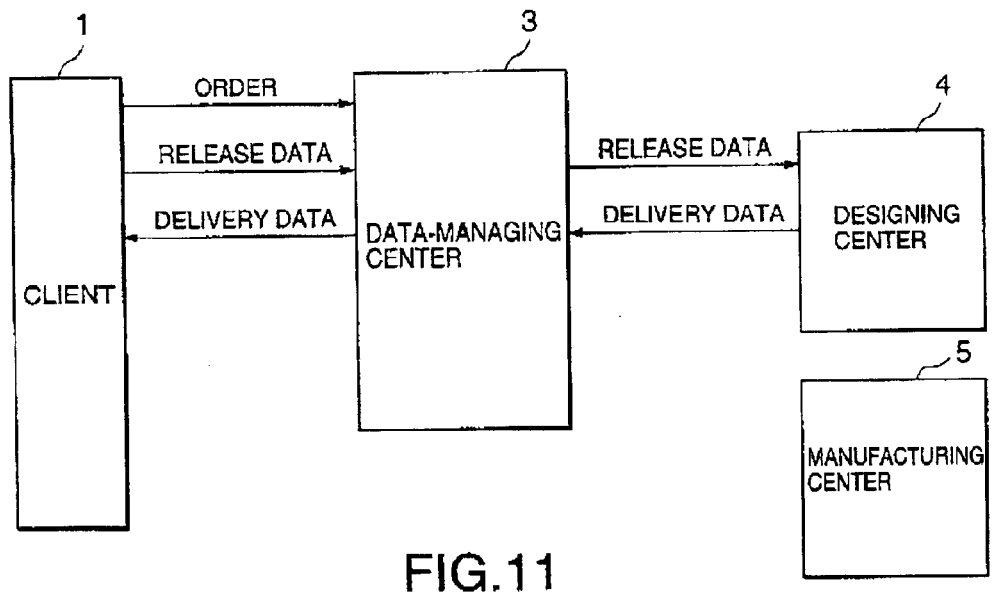
FIG. 11 shows a third order mode of the present invention, in which the client orders only designing.

FIG. 11. shows an example case where the client 1 places orders with a semiconductor manufacturer only for designing. In the illustrated example, the data-managing center 3 sends, to the designing center 4, release data received from the client 1. After completion of the designing, the designing center 4 sends delivery data to the data-managing center 3. The data-managing center 3 sends the delivery data to the client 1. Thus, the manufacturing center 5 does not participate in the data communication in the illustrated example.

Figure 12:
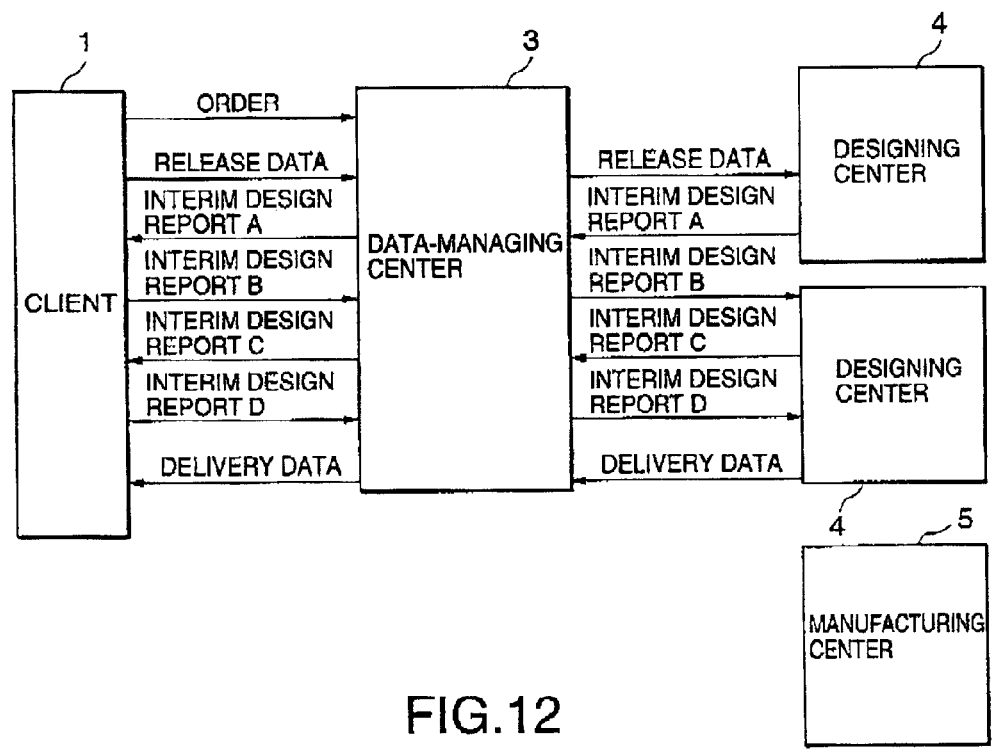
FIG. 12 shows a fourth order mode of the present invention, in which the client and a semiconductor manufacturer cooperatively performs designing.

In addition, a mode can be employed in which a client 1 and a semiconductor manufacturer closely cooperate with each other. That is, a mode for joint designing can be employed. FIG. 12 shows an example case where the joint designing is implemented in accordance with the second embodiment shown in FIG. 2. Referring to FIG. 12, the client 1 releases release data to the data-managing center 3, then the data-managing center 3 sends the data to the designing center 41. The designing center 41 carries out designing according to the release data, and sends an interim design report A to the client 1 via the data-managing center 3. The client 1 carries out design modification in consideration of the interim design report A, and generates an interim design report B. Then, the client 1 sends the interim design report B to the data-managing center 3. The data-managing center 3 sends the interim design report B to the designing center 42. The designing center 42 carries out designing according to the interim design report B, and sends an interim design report C to the client 1 via the data-managing center 3. These steps are repeated to thereby complete final delivery data.

Computer-Aided Design (CAD) Center

In many cases of ASIC manufacture, a semiconductor manufacturer provides developing tools and developing libraries to a client 1 to progress development by using common tools. To use the tools, a workstation is necessary. However, ones of the clients 1 possess personal computers but do not possess a workstation. Also, other ones of the clients 1 do not like to procure expensive commercially available tools. Taking the above into account, the configuration may be built such that a CAD center is provided as a part of the data-managing center 3 to thereby provide use environments for the developing tools and commercially available tools to the clients 1. In this case, the client 1 can use the CAD center through the Internet 2.

Databases

Hereinbelow, a description will be made about the various databases according to the embodiments of the present invention.

Cost/Number-of-Days Database

FIG. 13 shows a practical example of storage contents of the cost/number-of-days database 31. As shown in the figure, ASIC-manufacture courses are set in correspondence with product types of ASICs and urgency degrees. Each of the illustrated courses has a cost and the number of days as its attributes. Referring to FIG. 13, it is understood that, as the urgency is increased as in the order from "Lowest (Special Discount)", "Second lowest (Discount)", "Regular", "Second-highest", "Highest", the cost is increased in proportion thereto, but the number of days is reduced in inverse-proportion thereto. On the other hand, other cases are also provided. For example, the "Second Lowest (Discount)" course is not set for a product type A, and the "Highest" course and the "Lowest (Special Discount)" course are not set for a product type D.

Reservation status database

FIG. 14 shows a practical example of storage contents of the reservation status database 32. Referring to FIG. 14, an allowable reservation quantity is indicated at each of fields designated with the ASIC product types/courses and LSI-chip completion dates. Numeral "0" represents that no reservation request can be accepted, and numeral "1" represents that only one reservation request can be accepted. Defaults (initial values) of the acceptable reservation quantities are determined in consideration of the production capacity of a semiconductor manufacturer, market conditions, and the like. Also, the acceptable reservation quantities are reviewed according to the design/manufacture status and market conditions of a semiconductor manufacturer. In addition, upon receipt of reservation from a client 1, the acceptable reservation quantity is thereby reduced; whereas, upon receipt of cancellation for reservation, it is thereby increased.

Design/Manufacture Status Database

FIG. 15 shows a practical example of storage contents of the design/manufacture status database 33. Referring to Pig. 15, each row of clients 1, an order status, a release status, a design status, and a manufacture status are shown. The column of the order status shows the contents of orders, and contains items of chip-specific titles "Product Name", "Product Type", "Course" ("Regular", "Second-highest", or the like shown in FIGS. 13 and 14), and "Reservation Date". The column of the release status contains the items of "Information Type", "Scheduled Date" of the release, and "Completion Date" of the release. The item "Information Type" contains the type of release information sent from the client 1, such as a logic design specification, logic design data, circuit design data, layout data, or mask data. The column of the manufacture status contains the items of "Responsible Manufacturing Center Name", per-step "Scheduled Date", and per-step "Completion Date". The individual fields of "Scheduled Date" are determined upon acceptance of reservation. The row including "EFG" as "Product Name" contains information relating to an example order mode only for designing.

Center-Operation-Status Database

Normally, the designing center 4 has a number of designing lines, and the manufacturing center 5 also has a number of manufacturing lines. Therefore, in view of the capacity, the designing center 4 and the manufacturing center 5 individually access the data-managing center 3, and can increase or reduce their designing resources and manufacturing resources, according to the reservation status and the design/manufacture status. To implement the above, the data-managing center 3 has the center-operation-status database 60. FIG. 16 shows a practical example of storage contents of the center-operation-status database 60. In reference to FIG. 16, the database 60 has the items of "Number of Operating Resources", "Number of Resources", and "Operation Ratio" for each of designing centers X1, X2, . . . and each of manufacturing centers Y1, Y2, Y3, . . . . ."Operation Ratio" is obtained through the division of "Number of Operating Resources"/"Number of Resources". The figure shows an example status as of April 1, XXXX (year). Therefore, past experiences are shown in the fields of the period up to March, and the reservation status is shown in the field of the period from April. Since the designing center X1 had operated at high operation ratios, it increased the number of resources in March. Since the manufacturing center Y3 is additionally included in April, no status is shown in the fields of the period up to March. The low operation ratio thereof in May indicates that sufficient reservation requests are not as yet accepted.

One advantage available in accordance with the provision of the center-operation-status database 60 is that manufacture data of a plurality of products are incorporated and are embodied on a single wafer. In this case, the plurality of products may be those collected from different clients 1 This implements improvement in integration and efficiency of manufacture by taking the operation statuses in the individual manufacturing centers into account in the background of advancing technological development for large-diameter wafers. As a result, this improvement allows the manufacturing cost to be reduced. By making referential access to the center-operation-status database 60, the data-managing center 3 can thus make determination with regard to the above-described factors, and can direct the manufacturing centers to mount a plurality of products on individual wafers.

Cancellation Database

A case can occur in which, after once issuing a reservation request to a semiconductor manufacturer for ASIC manufacture, the client 1 wants to cancel the reservation request for some reasons. To be prepared for such a case, a cancellation database may be connected to the data-managing center 3. FIG. 17 shows a practical example of storage contents of the aforementioned cancellation database. Similarly to FIG. 13 showing the cost/number-of-days database 31, the figure shows ASIC-manufacture-reservation cancellation charges in fields of the ASIC product types and the urgency degrees. The number of days represents the number of remaining days in the period up to a scheduled release date. As can be seen from FIG. 17, the cancellation charge varies depending on the number of remaining days in the period up to the scheduled release date. Specifically, the smaller the number of remaining days, the higher the charge is set, and also, the higher the price of the product type and the urgency degree, the higher the cancellation charge is set.

Insurance Database

A case occurs in which a semiconductor manufacturer recommends that the client 1 have an insurance to prepare for a redesigning request and cancellation of a reservation from the client 1. For this purpose, an insurance database may be connected to the data-managing center 3. FIG. 18 shows a practical example of storage contents of the insurance database that stores data representing premiums of a redesign insurance and a cancellation insurance. In the figure, a redesign-insurance premium and a cancellation-insurance premium are set in fields of the product types and the urgency degrees. As the "Lowest (Special Discount)" course for the product type B, the database includes courses for which no insurance premium is set. The redesign-insurance premium is an insurance premium necessary either for providing redesign services free of charge or discounting a redesign fee, in consideration of predetermined times of redesign services. The cancellation-insurance premium is an insurance premium necessary for discounting a cancellation charge when a reservation cancellation occurs. A semiconductor manufacturer can request the client 1 to pay the aforementioned insurance premiums.

Per-Client Design-and-Manufacture Historical-Log Database

A per-client design/manufacture historical-log database may be connected to the data-managing center 3. FIG. 19 shows a practical example of the storage contents of the per-client design/manufacture historical-log database. As shown in the figure, the per-client design/manufacture historical-log database contains a current design/manufacture status and a past design/manufacture status in fields of the clients 1, the product names, and the product types. Specifically, the data base contains past design and manufacture order quantities, the numbers of past redesign (rework due to defects) occurrences, past reservation-cancellation ratios, with regard to clients 1. Product information data in the column "Current Product" are stored (registered) in the database upon acceptance of a reservation request, and they are deleted upon completion of scheduled designing and manufacturing. Upon determination of a cancellation, an asterisk (*) is entered in the sub-column "Cancellation" of the column "Current Product." Upon receipt of the payment of a cancellation charge, the product information data are deleted from the "Current Product" column. The "Total" column contains totals of past-to-current data corresponding to the respective fields in the "Current Product" column.

The data stored in the above-described per-client design/manufacture historical-log database is used to adjust service fees. Specifically, a semiconductor manufacturer offers a discount to a client 1 who issues a large number of orders for designing/manufacturing and to a good client 1 for which the redesign occurrence ratio is low. In contrast, the semiconductor manufacturer offers a higher redesign insurance premium to a client 1 for which the redesign occurrence ratio is high. In an extreme case, a semiconductor manufacturer uses the database to limit reservations, to disable long-term reservations, and to limit the courses, for example, to allow only courses except for the second-highest course.

Revision-Management Database

A revision-management database may be connected to the data-managing center 3. The revision-management database stores design data parameters in fields of the clients 1, the product types, and the revision levels of layout data. The design data parameters are data extracted from layout data, and a client 1 can make examination of the layout, such as delay analyses, according to the design data parameter. FIG. 20 relates to a practical example of storage contents of the revision-management database, where design data parameters are shown with regard to product names AAG and AAH for a client AAA1 at fields of the revision levels. When the client 1 has issued an additional order for the manufacture of ASICs, since the latest revision level thereof is known, a semiconductor manufacturer should be able to readily manufacture ASICs of the known revision level. Therefore, the client 1 need not send relative manufacture data to the data-managing center 3. When a defect has been caused because of layout data of which the revision level has been updated, control is performed to automatically return to the data to that of the previous revision. In addition, when a request has been received from a client 1 for estimation for, for example, the performance, the performance can be estimated by using relevant design data parameters.

Figure 21:
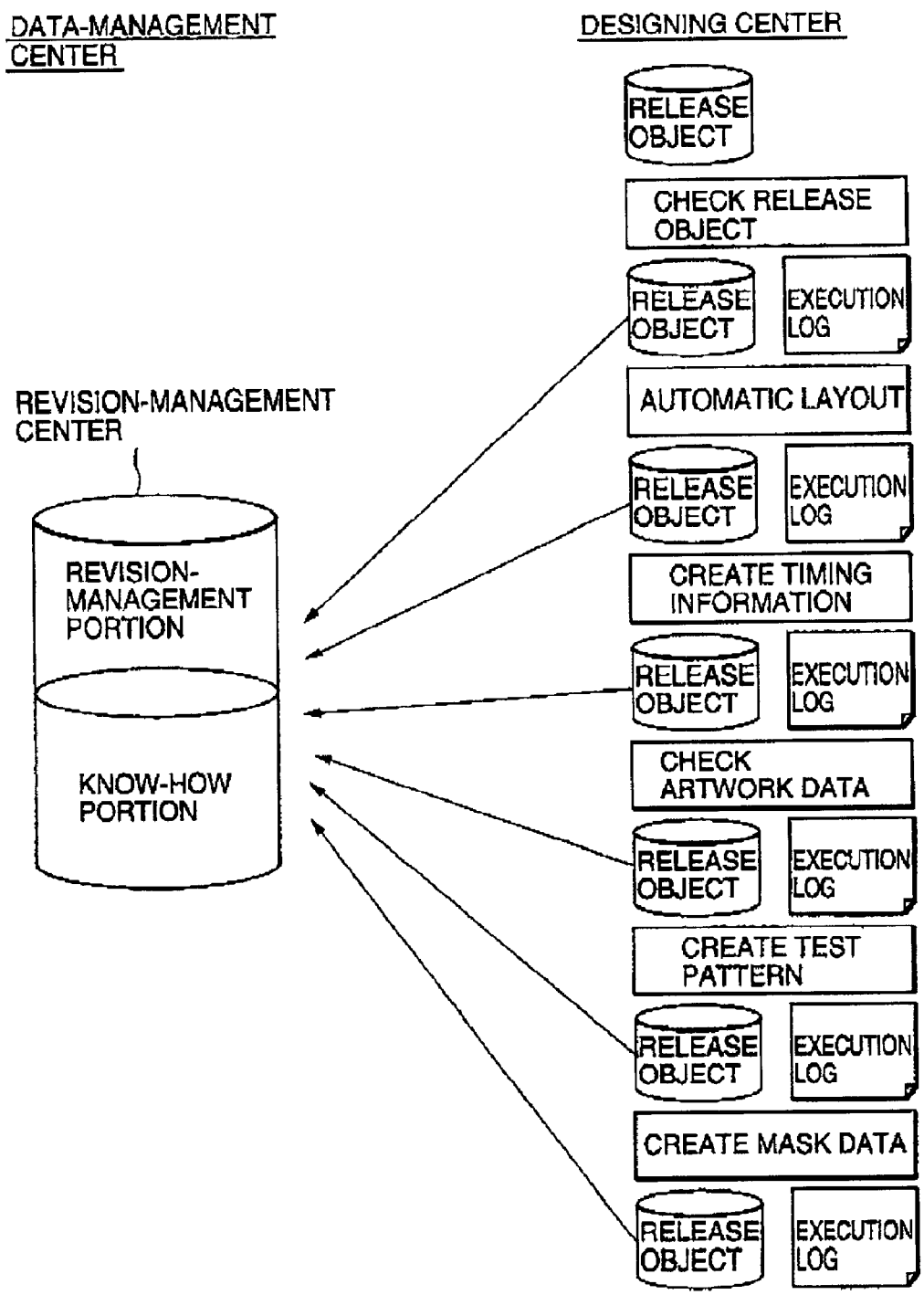
FIG. 21 shows a status where execution logs (reports) are input to the revision-management database according to the present invention.

FIG. 21 shows a status where execution logs (reports) are input to the revision-management database. As shown in the figure, the designing center 4 serially registers individual execution logs of steps, which starts with checking of a release object provided from the client 1 and ends with the creation of mask data, into the revision-management database. The revision-management database is segmented into a revision-management portion and a know-how portion. In addition to the aforementioned ASIC revisions, the revision-management portion stores developing tools and developing libraries. They need to match with those of each semiconductor manufacturer so that a consistent developing environment is shared on the sides the client 1 and the semiconductor manufacturer. Therefore, when the client 1 builds the developing environment on a workstation of its own and starts on designing, the client 1 sends revision information to its semiconductor manufacturers. On the other hand, when the semiconductor manufacturer has received release data from the client 1, the semiconductor manufacturer sends revision information to the client 1. In addition, when the semiconductor manufacturer has performed data-update or detects an occurrence of a defect, the semiconductor manufacturer sends the latest revision information to the client 1.

The know-how portion stores design know-how data in addition to the above-described design data parameters design data. The semiconductor manufacturer uses the information stored in the know-how portion to develop and provide a higher-performance design system to the client 1. The design know-how data includes, for example, layout data relative to design data released by the client 1, data on usage instances of developing tools, data on commercially available tools, data on problems caused by using the commercially available tools, and data on relations between circuit configurations and the number of days used for realizing the circuit configurations. Therefore, since the design know-how data can be used to reflect special factors on estimations of standard performance and schedules, the estimations are improved in precision. In addition, in an event where an apparatus using ASICs causes problems in peculiar usage environment several years later, the client may not have corresponding design data. Even in this event, the above-described design know-how allows problem-preventing redesigning to be implemented.

Details on Processing

Hereinbelow, a detailed description will be made about processing steps according to the second embodiment, with reference to a flowchart shown in FIGS. 22 and 23. Most portions other than those different from the above-described first embodiment may be applied to the first embodiment without modifications.

First, the client 1 inquires of the data-managing center 3 about schedules, costs, and capacity (step A1). In response, the data-managing center 3 performs number-of-days/cost/reservation-status-reporting processing (shown in FIG. 24 in detail) (step A2) and sends a response to the client 1. Then, the client 1 selects an optimal product type, course, and schedule, and issues a reservation request to the data-managing center 3 (step A3). In response, the data-managing center 3 performs reservation-acceptance determining processing (shown in FIG. 26 in detail) (step 4), and determines whether the reservation request is acceptable (step A5), in consideration of the processing result. At step A5, if the reservation request is determined to be unacceptable, the data-managing center 3 issues a reservation-unaccepted notification to the client 1 (step A6). Upon receipt of the notification, the client 1 reconsiders its reservation request to seek for alternative reservation conditions (step A7). As a result if the client 1 determines the alternative conditions to be acceptable, it returns to step A1, and carries out the steps A1 to A6 again. On the other hand, at step 5, if the reservation request is determined to be acceptable, the data-managing center 3 performs designing-center/manufacturing-center selecting processing (shown in FIG. 27 in detail) (step A8), and issues reservation-accepted notifications to the client 1 and selected designing center and manufacturing center (step A9). The client 1 prepares a release object including release data in the period by a reserved release date (step A10). In the period, however, since a case can occur in which the release cannot be prepared for some reasons, determination is made at a release-execution time (step A11) whether the release is possible. If the release is determined to be impossible, a cancellation notification (step A12) is issued to the data-managing center 3. In response, the data-managing center 3 performs canceling processing (shown in FIG. 28 in detail) (step A13).

Figure 23:
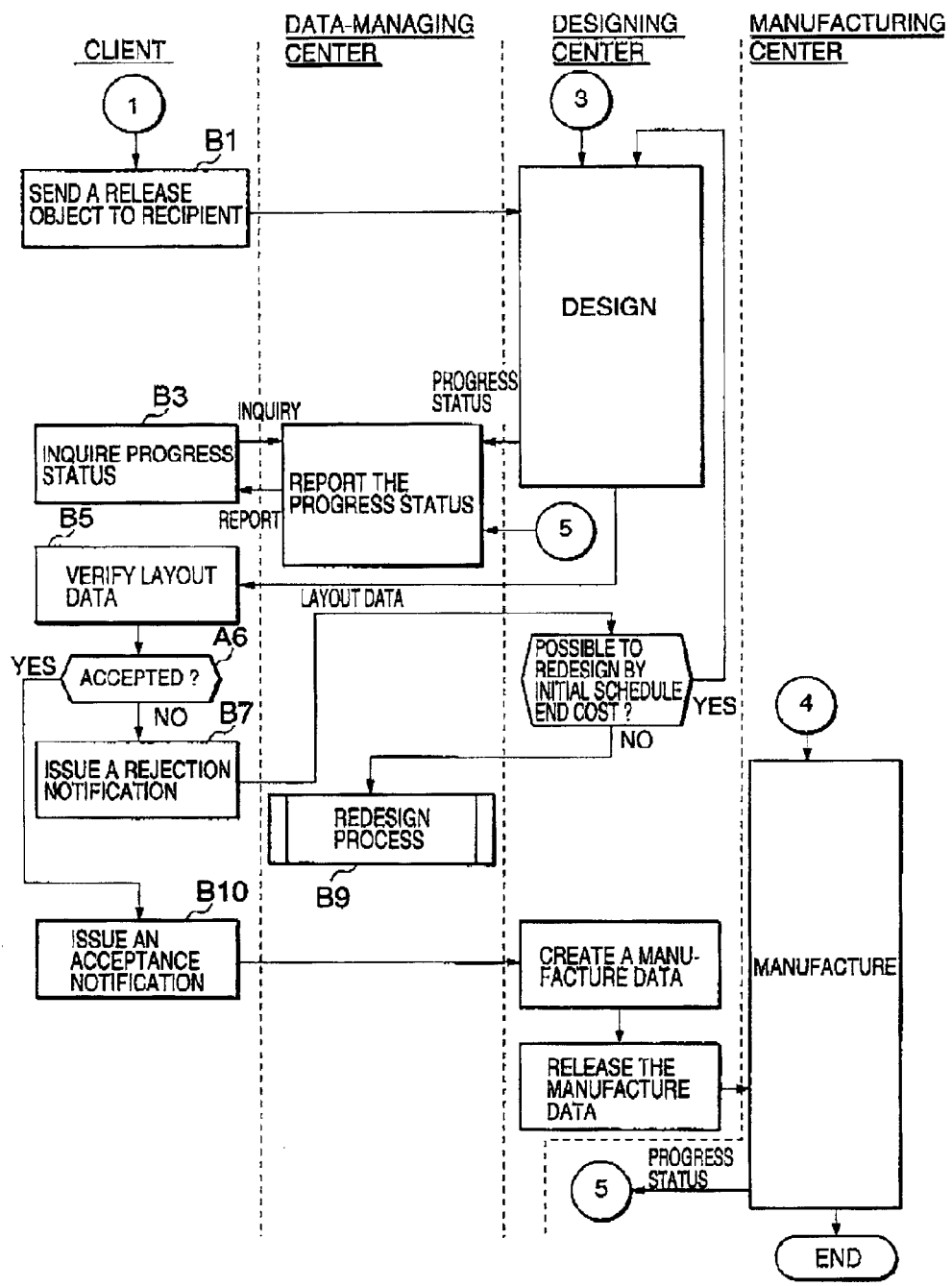
FIG. 23 is a second-half flowchart of the ASIC-manufacturing processing according to the second embodiment.

At step 11, if the release is determined to be possible, the client 1 sends the release object to a recipient of the release (designing center in the present example) (step B1 in FIG. 23). On the basis of the release object received from the client 1, the designing center creates layout data (step B2). During designing, the designing center reports the design-progress status to the data-managing center 3 (step B2). Therefore, depending on the necessity, the client 1 can inquire of the data-managing center 3 about the design progress status (step B8). Upon request from the client 1 or depending on the necessity, the data-managing center 3 reports the design-progress status to the client 1 (step B4).

Upon completion of the design, the designing center sends a layout data to the client 1 (step B2). The client 1 verifies the layout data (step B5), and determines whether the layout data is acceptable (step B6). If the layout data is unacceptable, the client 1 issues a rejection notification to the designing center (step B7). The designing center determines whether it can perform redesigning to meet the conditions of schedules and costs initially agreed upon (step B8). If it determines the redesigning to be possible, it returns to step B2, and start the redesigning. A certain number of redesigning processes can be performed, but it depends on the factors, such as the product type and the course. At step B8, if redesigning is determined to be impossible, redesigning processing (shown in FIG. 29 in detail) is performed in the data-managing center 3 (step B9). At step B6, if the layout data is determined to be acceptable, the client 1 issues an acceptance notification to the designing center (step B10). According to the notification, the designing center creates manufacture data from the layout data (step B11), and releases the manufacture data to the manufacturing center (step B12).

The manufacturing center manufactures LSI chips by using the manufacture data (step B13). During the manufacture, the manufacturing center reports the progress status to the data-managing center 3 (step B13). Thereby, the client 1 can inquire of the data-managing center 3 about the progress status of the manufacture when it desires (step B3). Upon request from the client 1, the data-managing center 3 reports the progress status to the client 1 (step B4). When the manufacture is completed, the manufacturing center transports LSI chips to the client 1 (step B13).

Details on Routine Processing

Figure 22:
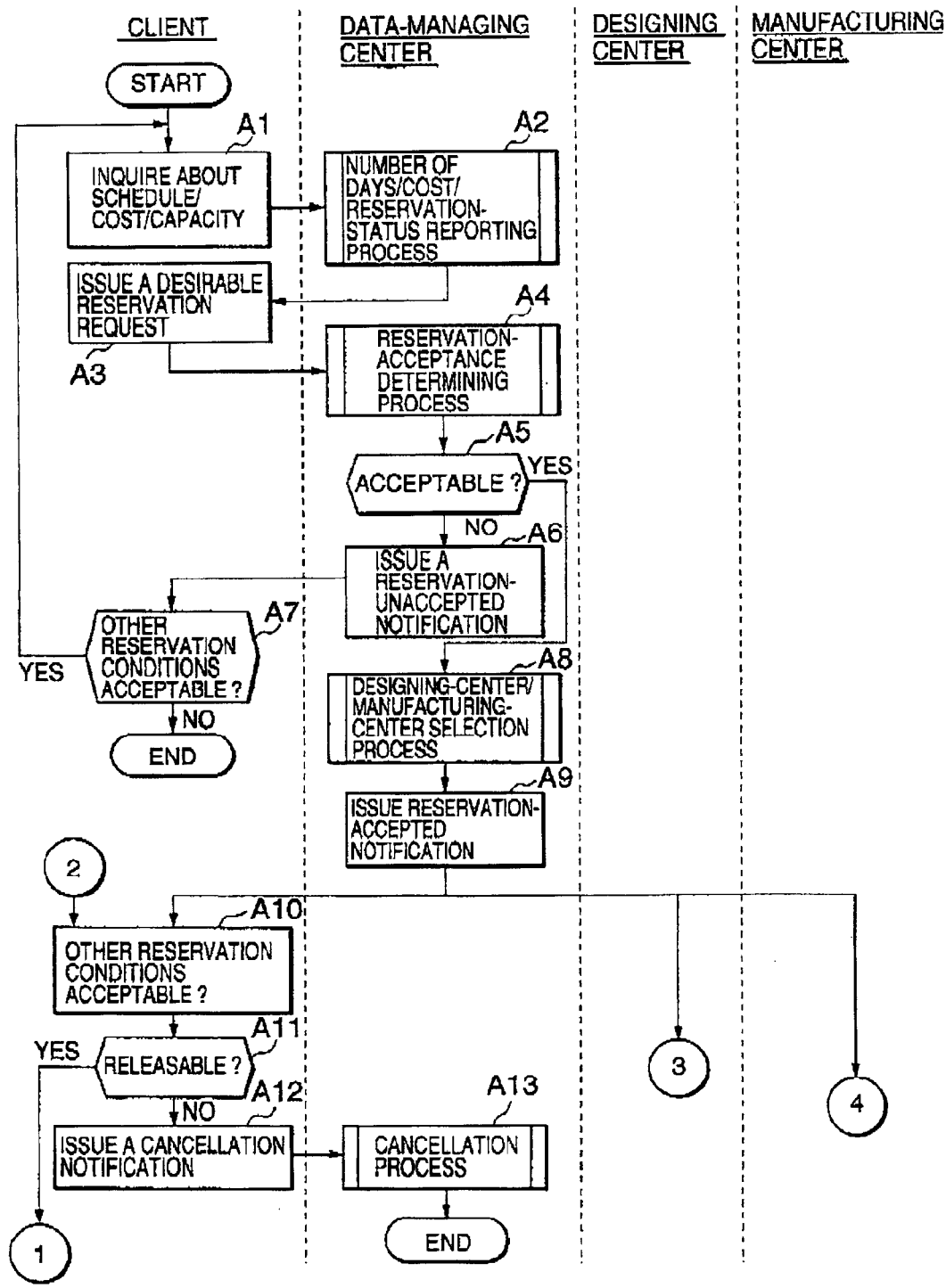
FIG. 22 is a first-half flowchart of ASIC-manufacturing processing according to the second embodiment.

FIGS. 24 to 30 show detailed flows of the routine processing in FIGS. 22 and 23.

Figure 24:
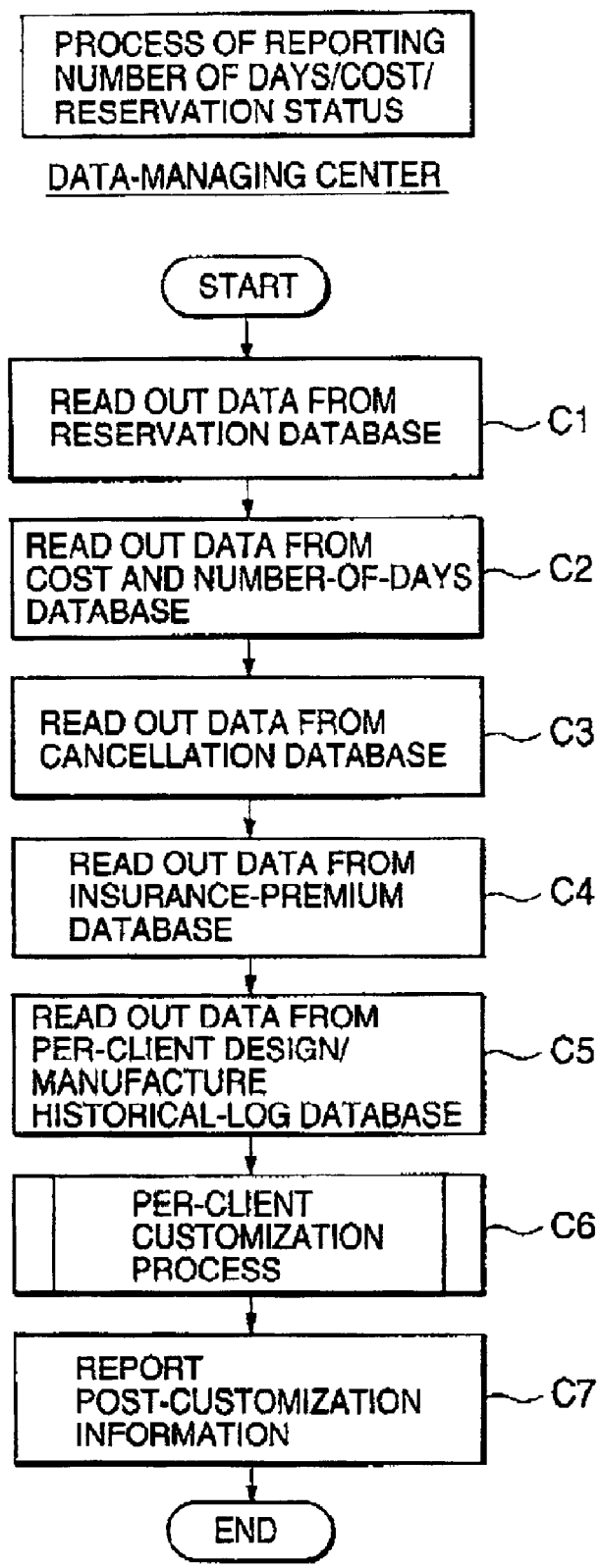
FIG. 24 is a flowchart of number-of-days/cost/reservation-status reporting processing shown in the process flowchart in FIGS. 22 and 23.

FIG. 24 is a detailed flowchart of the number-of-days/cost/reservation-status reporting processing (step A2 in FIG. 22). In FIG. 24, the data-managing center 3 accesses the reservation status database 32, the cost/number-of-days database 31, the cancellation database, the insurance-premium database, and the per-client design/manufacture historical-log database, and reads data out of the individual databases (steps C1 to C5). Then the data-managing center 3 performs per-client customizing processing (shown in FIG. 25 in detail) (step C6), and reports post-customization costs, number of days, acceptable reservation quantity, cancellation charge, and insurance premium to the client 1 (step C7).

Figure 25:
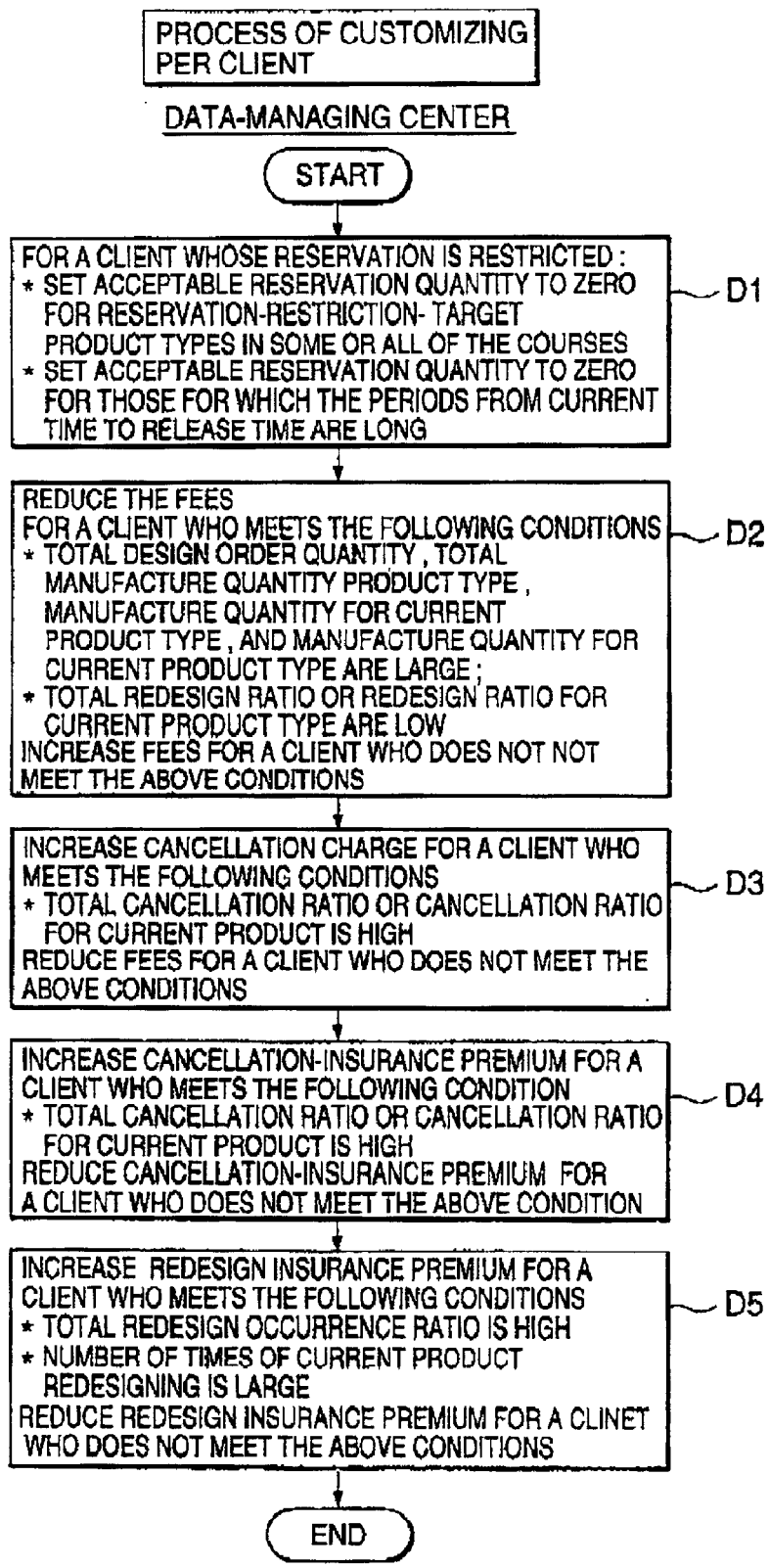
FIG. 25 is a flowchart of per-client customizing processing shown in the process flowchart in FIG. 24.

FIG. 25 is a detailed flowchart of the per-client customizing processing (step C6) shown in FIG. 24. In FIG. 25, for a client 1 subjected to reservation-restriction, the data-managing center 3 sets each of the acceptable reservation quantities to zeros for reservation-restriction-target product types in some or all of the courses (step D1). Concurrently, the data-managing center 3 sets the acceptable reservation quantities to zeros for those for which the periods from the current time to the release time are long. Thereby, the data-managing center 3 disables a long-term reservation to be made by the client 1 (step D1). In addition, the data-managing center 3 reduces fees for a client 1 applicable to the conditions that the total design order quantity, the total manufacture quantity, the design order quantity for the current product type, the manufacture quantity for the current product type are large; and the total redesign ratio or the redesign ratio for the current product type are low (step D2). Concurrently, for a client 1 applicable to the inverse conditions of the above, the data-managing center 3 increases the fees (step D2). For a client 1 applicable to the conditions that the total cancellation ratio or the cancellation ratio for the current product type is high, the data-managing center 3 increases the cancellation charge and the cancellation-insurance premium (steps D3 and D4). Concurrently, for a client 1 applicable to the inverse conditions of the above, the data-managing center 3 reduces the cancellation charge and the cancellation-insurance premium (steps D3 and D4). Furthermore, for a client 1 applicable to the conditions that the total redesign occurrence ratio is high or that the number of redesign times for the current product type is large, the data-managing center 3 increases the redesign insurance premium (step D5). Concurrently, the data-managing center 3 reduces the redesign insurance premium for a client 1 applicable to the inverse condition of the above (step D5).

Figure 26:
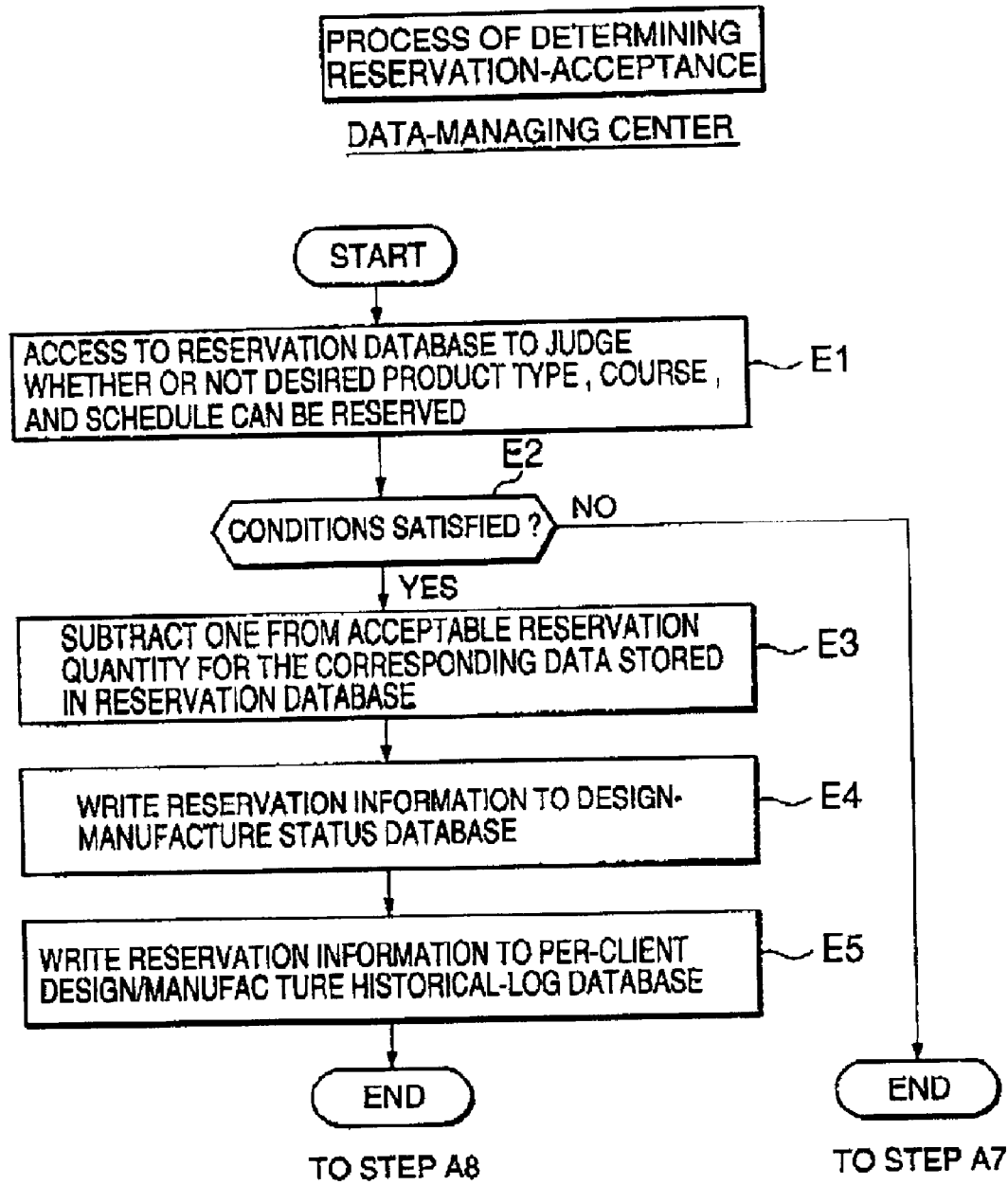
FIG. 26 is a flowchart of reservation-reception determining processing shown in the process flowchart in FIG. 24.

FIG. 26 is a detailed flowchart of reservation-acceptance determining processing (step A4 in FIG. 22). In FIG. 26, the data-managing center 3 accesses the reservation status database 32 to judge whether desired product type, course, and schedule can be reserved (step E1). As a result if the reservation is impossible (step E2), the data-managing center 3 terminates the reservation-acceptance determining processing. If the reservation is possible (step E2), the data-managing center 3 subtracts one from an acceptable reservation quantity for the corresponding data stored in the reservation status database 32 (step E3), in order to update the acceptable reservation quantity. Then, the data-managing center 3 writes the reservation information to the design/manufacture status database 33 (step E4), and also writes the reservation information to the per-client design/manufacture historical-log database (step E5).

Figure 27:
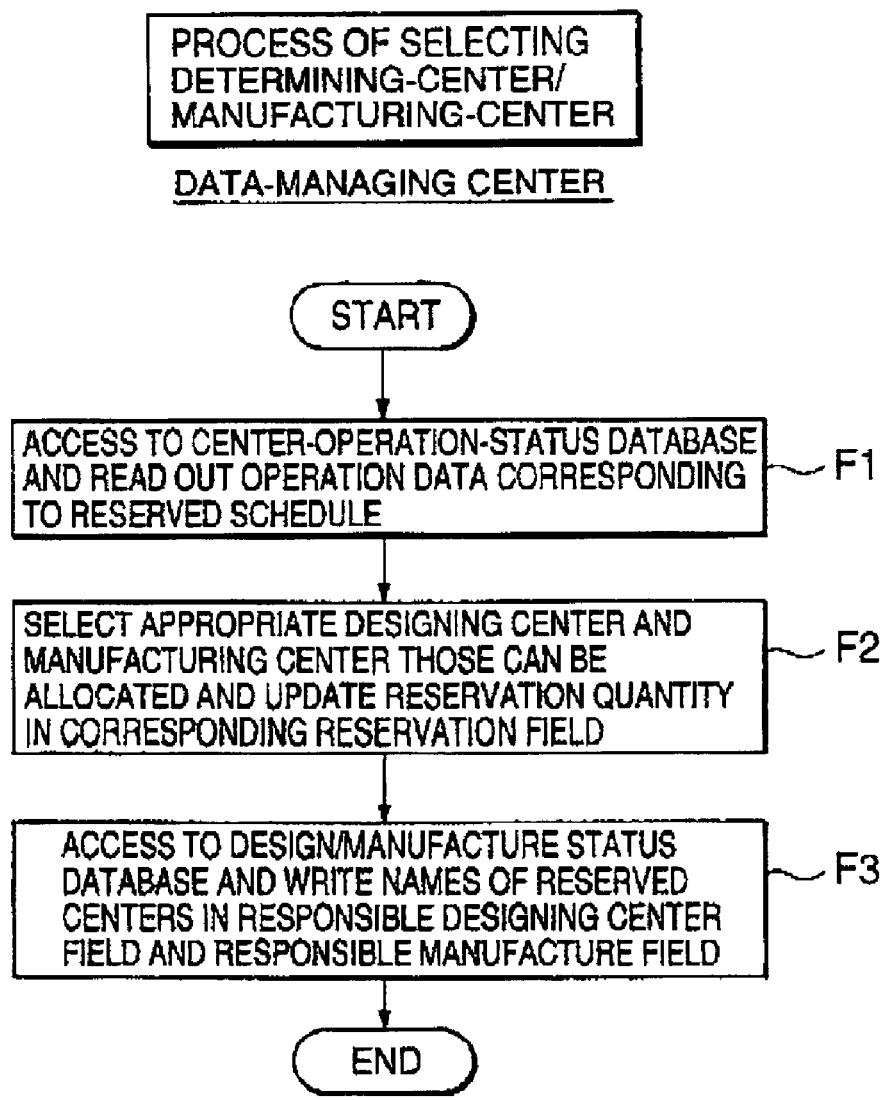
FIG. 27 is a flowchart of designing-center/manufacturing-center selecting processing shown in the flowchart in FIGS. 22 and 23.

FIG. 27 is a detailed flowchart of designing-center/manufacturing-center selecting processing (step A8 in FIG. 22). In FIG. 27, the data-managing center 3 accesses the center-operation-status database 60, and reads operation data corresponding to the reserved schedule (step F1) out of the database 60. Subsequently, the data-managing center 3 selects a designing center and a manufacturing center that can be allocated to the order, and updates reservation quantities in the corresponding reservation fields (number of operating resources to be written in the fields under "Number of Operating Resource" items shown in FIG. 16) (step F2). Subsequently, the data-managing center 3 writes the names of the reserved centers in the fields of the responsible designing center and the responsible manufacturing center in the design/manufacture status database (step F3).

Figure 28:
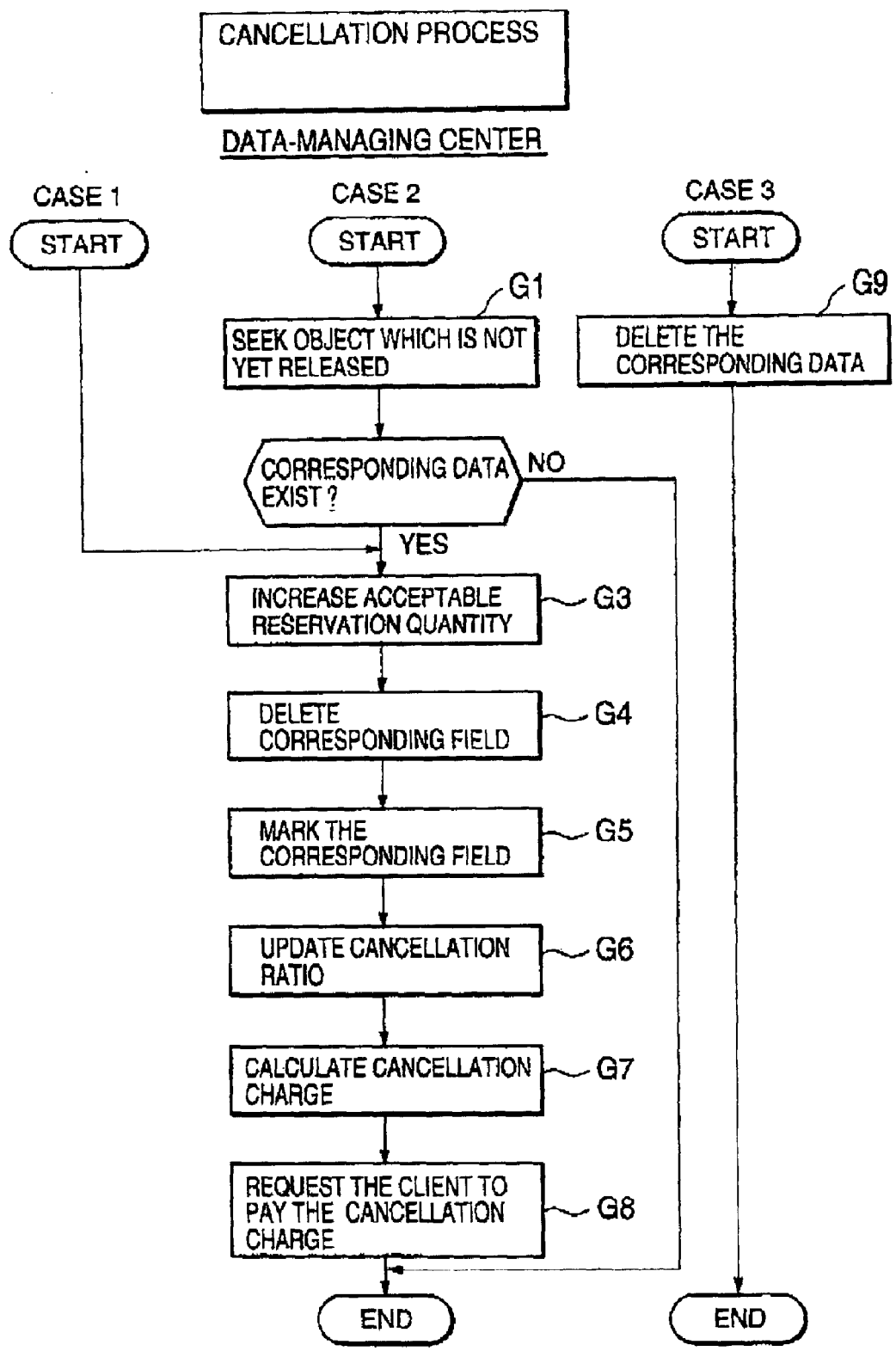
FIG. 28 is a flowchart of canceling processing shown in the process flowchart shown in FIGS. 22 and 23.

FIG. 28 is a detailed flowchart of canceling processing (step A13 in FIG. 22). The canceling processing has three types of processing: automatic canceling processing (Case 1); canceling processing to handle a canceling request received from a client 1 (Case 2); and canceling processing to handle a case where a cancellation charge is paid by a client 1 (Case 3). In the automatic canceling processing, the data-managing center 3 accesses the design/manufacture status database 33, searches for a case where release data is not yet released from the client 1 even after a scheduled release date (step G1), and thereby determines whether data corresponding the case exists in the database (step G2). If the corresponding data is detected, the data-managing center 3 adds one to the acceptable reservation quantity of the corresponding data in the reservation status database 32 (step G3) to update the quantity, and deletes corresponding data from the design/manufacture status database 33 (step G4). The data-managing center 3 also enters a mark in the corresponding field of the current-product-type cancellation field in the per-client design/manufacture historical-log database (step G5), and updates the corresponding cancellation ratio in the "Total" field in the database (step G6). In addition, the data-managing center 3 calculates the cancellation charge according to the storage contents of the cancellation database (step G7), and requests the client 1 to pay the cancellation charge (step G8). On the other hand, when a cancellation request is received from a client 1, the data-managing center 3 carries out the routine from steps G3 to G8. When the cancellation charge is paid by a client 1, the data-managing center 3 carries out only processing (step G9) to delete the corresponding data from the "Product Type" column of the per-client design/manufacture historical-log database.

Figure 29:
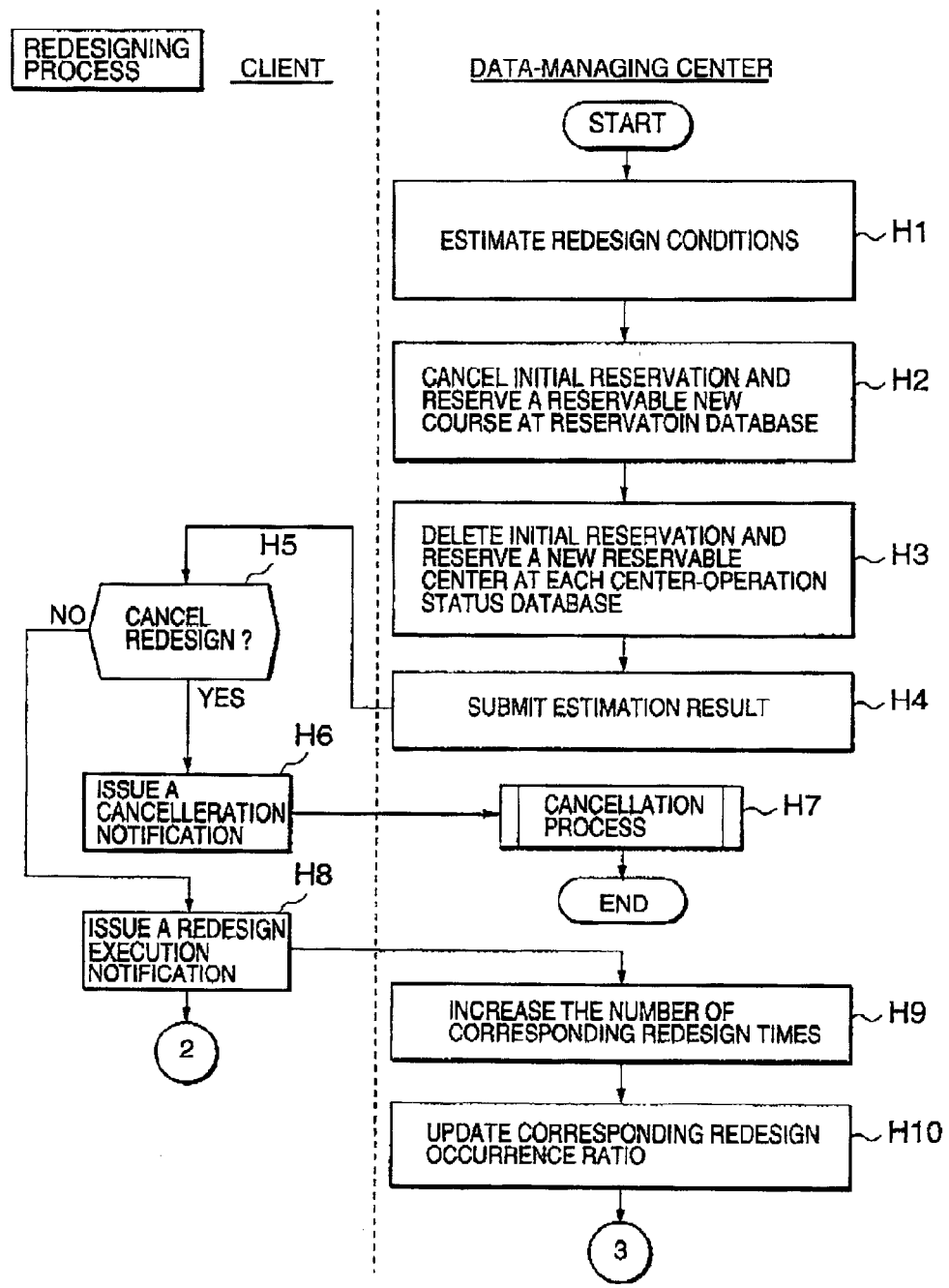
FIG. 29 is a flowchart of redesigning processing shown in the process flowchart in FIGS. 22 and 23.

FIG. 29 is a detailed flowchart of redesigning processing (step B9 in FIG. 23). First, the data-managing center 3 estimates redesign conditions (necessary schedules and costs) in accordance with the initial schedule and costs and the causes for the redesign (step H1). Then the data-managing center 3 accesses the reservation status database 32 to cancel the initial reservation, and reserves a possible course that satisfies the redesign conditions (step H2). Subsequently, the data-managing center 3 accesses the center design/manufacture status database 33, cancels the initial reservation, and reserves possible operation centers that satisfy the redesign conditions (step H3). Then, the data-managing center 3 submits an estimation result (the course, schedules, additional costs, etc.) to the client 1 (step H4). In response, the client 1 determines whether to cancel the request for the redesign reservation (step H5). To cancel the request, the client 1 issues a cancellation notification (step H6). In response, the data-managing center 3 performs canceling processing (shown in FIG. 28) (step H7). On the other hand, not to cancel the request for the redesign reservation, the client 1 issues a redesign execution notification to the data-managing center 3 (step H8). In response, the data-managing center 3 adds one to the number of redesign times on the corresponding field in the current product column (step H9), and updates the corresponding field of redesign occurrence ratio in the "Total" field (step H10).

Estimation

As can be easily understood from the above description, after the client 1 inputs requirements for the costs, delivery, performance, chip sizes, and the like, the data-managing center 3 totally considers the requirements of the client 1 by accessing and referring to data contained in, for example, specifications of individual product types, the cost/number-of-days database 31, the reservation status database 32, and the design/manufacture status database 33. As a result, the data-managing center 3 can estimate most suitable product types, courses, and the like, and can submit the estimation result to the client 1. On the other hand, when the client 1 submits design data (data to be used by the semiconductor manufacturer to design the ordered ASICs), the designing center 4 in the semiconductor manufacturer can estimate the performance and the areas of the chips by using developing tools. The semiconductor manufacturer can make charge free or can prepare the estimation to include price-reduction when an order is issued therefor. In addition, when the client 1 submits the aforementioned design data, the semiconductor manufacturer can temporarily estimate the performance, the areas of the chips, and the like, in accordance with past design data obtained through reference to the data in the revision-management database, and can submit the estimation to the client 1. Also in this case, the estimation is handled similarly to that described above.

Figure 30:
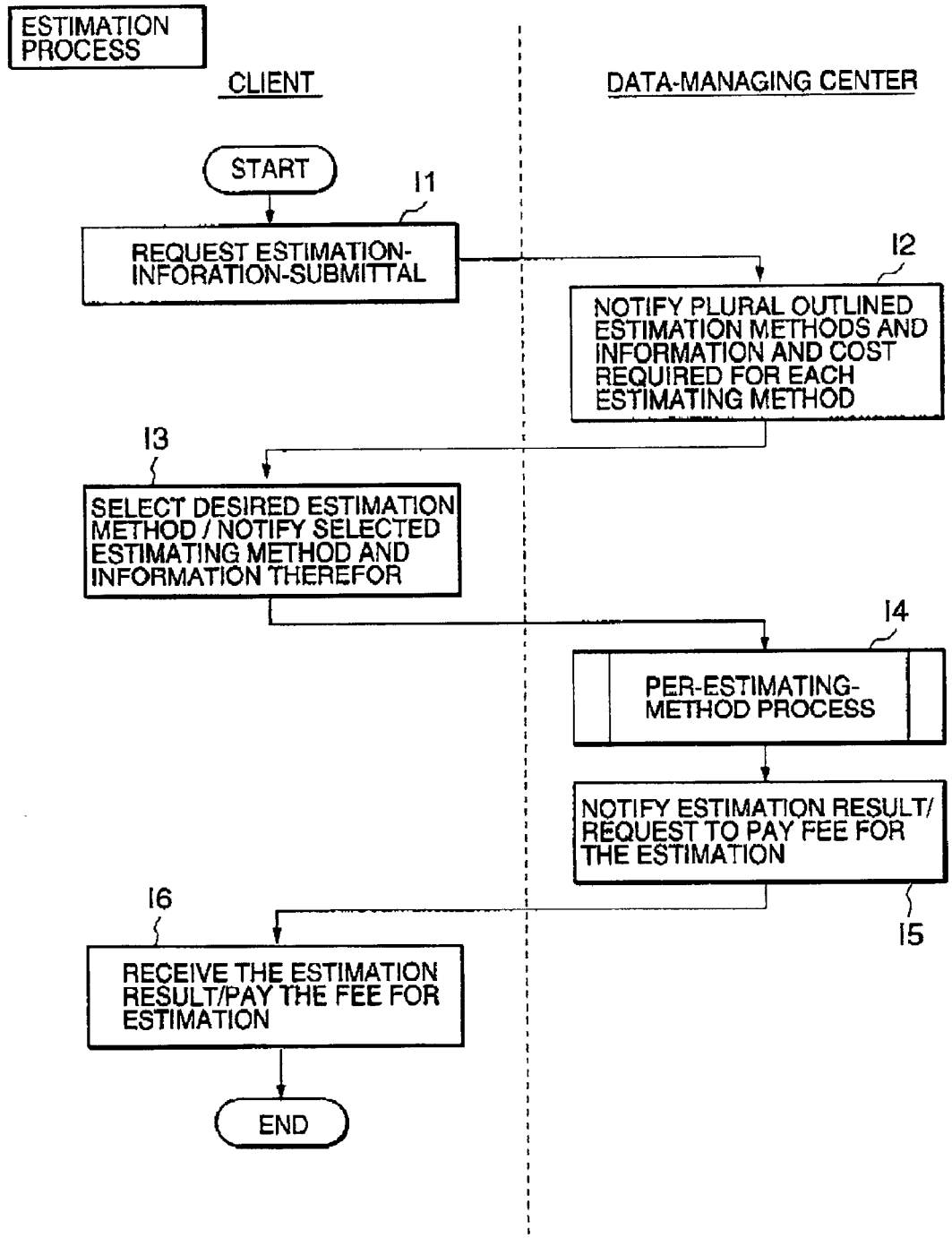
FIG. 30 is a flowchart of a first estimating processing according to the present invention.

FIG. 30 is a flowchart of estimating processing to be performed in response to a request made from a client 1 to the data-managing center 3 for estimation of the ASIC performance. In FIG. 30, first, the client 1 makes an estimation-information-submittal request to the data-managing center 3 (step I1). In response, the data-managing center 3 notifies a plurality of outlined estimating methods, and information and costs that are required for each of the estimating methods (step I2). The client 1 selects desired one of the estimating methods, and notifies the title of the selected estimating method and information necessary for the estimation to the data-managing center 3 (step I3). The data-managing center 3 performs per-estimating-method processing (see FIG. 31) (step I4), and notifies the estimation result to the client 1. Depending on the necessity, the data-managing center 3 requests the client 1 to pay a fee for the estimation (step I5). The client 1 receives the estimation result, and pays the fee for the estimation depending on the requirement (step I6).

Figure 31:
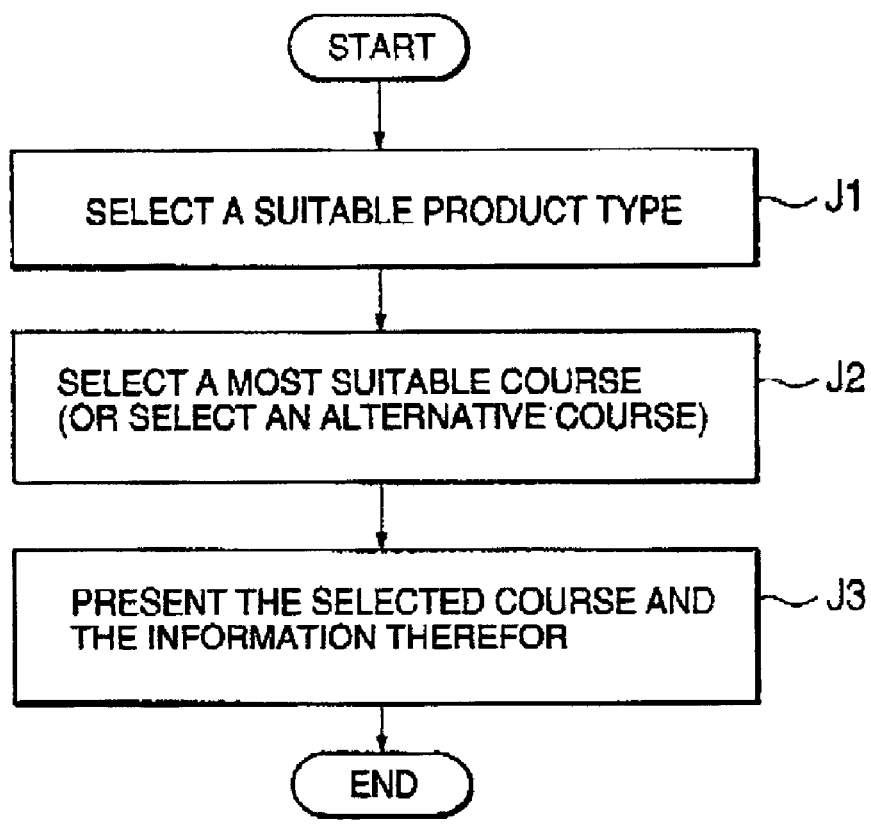
FIG. 31 is a flowchart of a second estimating processing according to the present invention.

FIG. 31 is a detailed flowchart of a first estimating method in the per-estimating-method processing at step 14 in FIG. 30. In FIG. 31, the data-managing center 3 selects a product type that satisfies requirements of the client 1 for the performance according to specifications of various product types (which are stored in a database (not shown))(step J1). Thereby, the data-managing center 3 selects a course satisfying the requirements of the client 1 for the schedule and costs, taking into consideration data on the corresponding product type which is contained in the reservation status database 32 and the cost/number-of-days database 31 (step J2). In this case, if no product type satisfying all the requirements of the client 1 can be detected, the data-managing center 3 detects one or more alternative courses. Subsequently, the data-managing center 3 presents information on selected product types and schedules and costs therefor to the client 1 (step J3).

Figure 32:
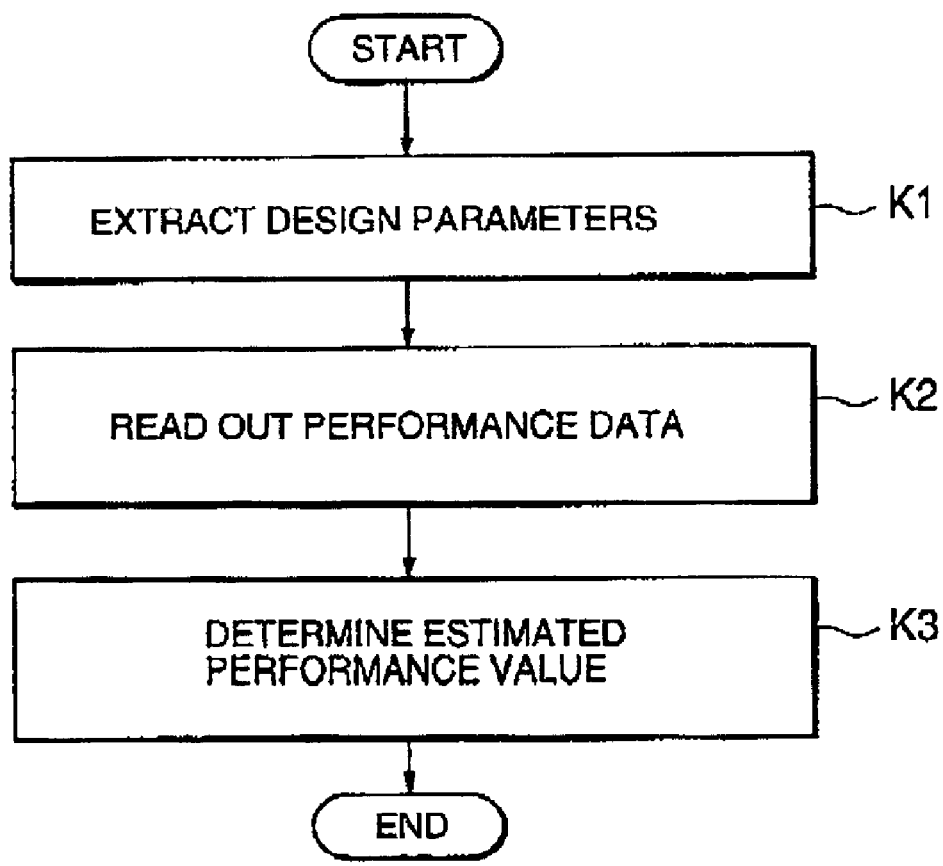
FIG. 32 is a flowchart of a third estimating processing according to the present invention.

FIG. 32 is a detailed flowchart of a second estimating method in the per-estimating-method processing at step 14 in FIG. 30. In FIG. 32, from the data submitted by the client 1, the data-managing center 3 extracts design parameters that are used for comparison (step K1). From past data obtained through access to the revision-management database, the data-managing center 3 retrieves design parameters proximate to the design parameters extracted from the data submitted by the client 1, and reads out performance data therefrom (step K2). The performance data means data of speeds, areas, and consumption power. The data-managing center 3 modifies the performance data read out depending on the necessity, and thereby determines estimated performance values (step K3). This means that, for example, although no data matching the data submitted by the client 1 exists in the revision-management database, when a plurality of items of data proximate thereto exist, the mean value of values represented by the proximate data is used as estimation values.

Automation of Designing Center

In general, when the designing processing transfers from one phase to another phase, it is necessary to manually determine whether to accept or to reject. When a person in charge is off, the processing is thereby delayed. Therefore, the processing to be performed in the designing center 4 may be automated so that interstep losses are eliminated, and design-progress-status information is automatically submitted to the client 1. This enables the client 1 to proceed subsequent processing at its discretion.

In objects to be automated in the designing center 4, it is particularly important to handle back annotation data. The back annotation data refers to timing-delay data of signals in an ASIC designed by the designing center 4. According to the automation arrangement, the designing center 4 automatically executes the steps up to the step of creating the back annotation data unless a problem occurs. The designing center 4 automatically transmits the created back annotation data to the client 1 via the data-managing center 3. Concurrently, the designing center 4 notifies the client 1 of completion in the creation of the back annotation data through, for example, an E-mail system.

The client 1 performs simulation, thereby verifies whether the back annotation data satisfy specification, and notifies the verification result to the designing center 4. In this case, the processing is performed such that the client 1 enters ID information through a web browser and clicks an "OK" button or a "Submit" button to thereby send the aforementioned notification to the designing center 4. If the designing center 4 receives an acceptance notification for the back annotation data, it automatically performs mask-data generation and artwork-data verification, and performs automatic transmission of the generated mask data and test patterns to the manufacturing center 5. The automatic processing described above allows the prevention of an incidence where the processing is delayed because of convenience on the side of the designing center 4. On the other hand, if the back annotation data is rejected in quality, the client 1 activates the web browser and can issue a request to the designing center 4 for redesigning. In this case, an agreement is preferably established such that no extra fees are charged for a predetermined number of redesigning operations. Instead of the web browser, the client 1 may use the E-mail system to add necessary information such as the ID information and to send the response through the E-mail system.

As above, although description has been made with reference to the ASICs, the present invention may be applied to other semiconductor integrated circuits that are required to be manufactured in close contact between a client and a semiconductor manufacturer.

What is claimed is:

1. A system of manufacturing a semiconductor integrated circuit, comprising:

a data-managing center comprising: a cost/number-of-days database containing data representing courses for manufacturing the semiconductor integrated circuit, each course having attributes of cost and the number of days in fields of product types and urgency degrees of the semiconductor integrated circuit; a reservation status database containing data of an acceptable reservation quantity in fields of the product types and the urgency degrees of the semiconductor integrated circuit and in fields of chip-completion dates; and a design/manufacture status database containing data representing status of ordering, releasing, designing, and manufacturing in fields of a client; said data-managing center communicating with said client to thereby perform data management;

a designing center communicating with said client and performing designing of the semiconductor integrated circuit on the basis of release data from said client, to output layout data as a product of the designing;

a manufacturing center which performs manufacturing of the semiconductor integrated circuit according to manufacture data that is released from one of said designing center and said client and that is intended for use in the manufacturing; wherein:

said data-managing center, said designing center, and said manufacturing center being connected together via the Internet; and each of said centers uses information contained in said databases of said data-managing center, performing two-way communication with said client, and thereby progressing the production of the semiconductor integrated circuit.

2. A system of manufacturing a semiconductor integrated circuit as claimed in claim 1, wherein:

the client selects one of three order modes which are a design-and-manufacture order mode, a design-only order mode, and a manufacture-only order mode; and said data-managing center uses relative information contained in said databases in correspondence with the selected order mode.

3. A system of manufacturing a semiconductor integrated circuit as claimed in claim 1, wherein said data-managing center performs referential access to said cost/number-of-days database and said reservation status database to thereby accept reservation requested by said client.

4. A system of manufacturing a semiconductor integrated circuit as claimed in claim 1, wherein said designing center sends said layout data to said client so that the client can verify the layout data.

5. A system of manufacturing a semiconductor integrated circuit as claimed in claim 4, wherein said client checks said layout data repeatedly sent by said designing center until complete layout data is produced.

6. A system of manufacturing a semiconductor integrated circuit as claimed in claim 4, wherein said data-managing center reconsiders cost and the number of days in a corresponding order, on the basis of the verification of the layout data on said client.

7. A system of manufacturing a semiconductor integrated circuit as claimed in claim 1, wherein said data-managing center performs referential access to said reservation status database and said design/manufacture status database to thereby reconsider acceptable reservation quantities, designing resources, and manufacturing resources.

8. A system of manufacturing a semiconductor integrated circuit as claimed in claim 1, wherein: one of said designing center and said data-managing center comprises a design data file for retaining release data provided from said client; and one of said manufacturing center and said data-managing center comprises a manufacture data file for retaining said manufacture data provided from one of said designing center and said client, so that said client need not resend said release data.

9. A system of manufacturing a semiconductor integrated circuit as claimed in claim 8, wherein: a mirrored line connects said Internet to each of said centers; and a mirrored line connects said data-managing center to each of said databases, said design data file, and said manufacture data file.

10. A system of manufacturing a semiconductor integrated circuit as claimed in claim 1, further comprising a mirror server which has databases identical to said cost/number-of-days database, said reservation status database, and said design/manufacture status database, and which is also connected to said Internet and performs the same operation as that of said data-managing center.

11. A system of manufacturing a semiconductor integrated circuit as claimed in claim 1, wherein:

said client is connected to each of said databases via a virtual private network; and when said client performs access to each of said databases, connection authentication for the access is performed according to one of ID information allocated to said client, information specific to a machine of said client, and information on a tool license of said client.

12. A system of manufacturing a semiconductor integrated circuit as claimed in claim 1, wherein said data-managing center further comprises a cancellation database containing data representing a cancellation charge for reservation for the manufacture of the semiconductor integrated circuit in fields of the product types and the urgency degrees.

13. A system of manufacturing a semiconductor integrated circuit as claimed in claim 1, wherein said data-managing center further comprises a center-operation-status database containing, in fields of said designing center and said manufacturing center, data of the number of resources and an operation ratio which represent a past-current operation experience and a future operation prospect; the data-managing center allocating appropriate one of said designing centers and appropriate one of said manufacturing centers according to current or future operation conditions; the data-managing center increasing or reducing the acceptable reservation quantity.

14. A system of manufacturing a semiconductor integrated circuit as claimed in claim 13, wherein, based on requirements input by said client for price, delivery time, performance, and chip size, said data-managing center refers to specifications of each product type, the information contained in said cost/number-of days database, said reservation status database, and said center-operation-status database, totally examines the requirements, estimates an optimal product type and course, and submit the result to said client.

15. A system of manufacturing a semiconductor integrated circuit as claimed in claim 1, wherein said data-managing center further comprises a center-operation-status database containing, in fields of said designing center and said manufacturing center, data of the number of resources and an operation ratio which represent a past-current operation experience and a future operation prospect; the data-managing center issuing an instruction for incorporation of manufacture data of a plurality of products to embody the manufacture data of the products on one wafer in accordance with current or future operation conditions.

16. A system of manufacturing a semiconductor integrated circuit as claimed in claim 1, wherein said data-managing center further comprises a per-client design/manufacture historical-log database containing current and past design/manufacture status which include design/manufacture order quantities, the number of redesign occurrences, and a reservation-cancellation ratio, in fields of the clients and the product types; the data-managing center offering deduction for designing/manufacturing; the data-managing center increasing or reducing a redesign insurance premium, a cancellation charge, and a cancellation-insurance premium; the data-managing center restricting reservations and course selection according to the data.

17. A system of manufacturing a semiconductor integrated circuit as claimed in claim 1, wherein said data-managing center further comprises an insurance-premium database containing data representing an insurance premium and a cancellation-insurance premium in fields of the product types and the urgency degrees, and makes a redesign fee and the cancellation charge to be free within predetermined times, or offers deduction thereof.

18. A system of manufacturing a semiconductor integrated circuit as claimed in claim 1, wherein said data-managing center further comprises a revision-management database containing data representing design data parameters and design know-how of said design center in fields of the clients, the product types, and revisions, said design data parameters being extracted from layout data output from said designing center, so that a revision is automatically returned to a previous version when a defect is caused in a product and is used by said revision-management database to estimate the performance and the area of a product.

19. A system of manufacturing a semiconductor integrated circuit as claimed in claim 1, wherein said data-managing center further comprises a developing-tool-revision-management database to thereby manage developing tools on the sides of said client and said semiconductor manufacturer to be the same.

20. A system of manufacturing a semiconductor integrated circuit as claimed in claim 1, further comprising a CAD center for providing an environment for using developing tools and commercially available tools to said client.

21. A system of manufacturing a semiconductor integrated circuit as claimed in claim 1, wherein:
said designing center performs automatic execution of steps up to creation of back annotation data, said designing center automatically transmitting the created back annotation data to said client via said data-managing center, said designing center notifying completion in the creation of the back annotation data to said client, said designing center automatically generating mask data, said designing center verifying artwork data when an acceptance notification for the back annotation data is received as an inspection result from said client, said designing center automatically transmitting the generated mask data and test patterns to said manufacturing center.

22. A system of manufacturing a semiconductor integrated circuit, comprising:
a data-managing center comprising: a cost/number-of-days database containing data representing courses for manufacturing the semiconductor integrated circuit, each course having attributes of cost and the number of days in fields of product types and urgency degrees of the semiconductor integrated circuit; a reservation status database containing data of an acceptable reservation quantity in fields of the product types and the urgency degrees of the semiconductor integrated circuit and in fields of chip-completion dates; a design/manufacture status database containing data representing status of ordering, releasing, designing, and manufacturing in fields of a client, said data-managing center communicating with said client to thereby perform data management;

a plurality of designing centers each of which closely communicates with said client and performs design of the semiconductor integrated circuit according to release data provided from said client, so as to output layout data as a product of the designing; and a plurality of manufacturing centers each of which performs manufacturing of the semiconductor integrated circuit according to manufacture data that is released from one said designing center and said client and that is intended for use in the manufacturing; wherein:

said data-managing center, said designing centers, and said manufacturing centers being connected together via the Internet; and each of said centers uses information contained in said databases of said data-managing center, performing two-way communication with said client, and thereby progressing the production of the semiconductor integrated circuit.

23. A system of manufacturing a semiconductor integrated circuit as claimed in claim 22, wherein said data-managing center performs referential access to said reservation status database and design/manufacture status database to thereby increase or decrease the number of one of said designing center and said manufacturing center.

24. A system of manufacturing a semiconductor integrated circuit as claimed in claim 22, wherein said manufacture data output from said designing center is sent through said data-managing center to said manufacturing center selected by said data-managing center or directly to a predetermined one of said manufacturing centers.

* * * * *